United States Patent
Shiodera et al.

(10) Patent No.: US 12,225,227 B2
(45) Date of Patent: *Feb. 11, 2025

(54) IMAGE ENCODING METHOD AND IMAGE DECODING METHOD

(71) Applicant: KABUSHIKI KAISHA TOSHIBA, Tokyo (JP)

(72) Inventors: Taichiro Shiodera, Tokyo (JP); Saori Asaka, Tokyo (JP); Akiyuki Tanizawa, Kawasaki (JP); Takeshi Chujoh, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,396

(22) Filed: Dec. 12, 2023

(65) Prior Publication Data

US 2024/0107057 A1   Mar. 28, 2024

Related U.S. Application Data

(63) Continuation of application No. 17/573,020, filed on Jan. 11, 2022, now Pat. No. 11,889,107, which is a
(Continued)

(30) Foreign Application Priority Data

Apr. 8, 2010 (WO) .................. PCT/JP2010/056400

(51) Int. Cl.
*H04N 19/513* (2014.01)
*H04N 19/105* (2014.01)
(Continued)

(52) U.S. Cl.
CPC ......... *H04N 19/521* (2014.11); *H04N 19/105* (2014.11); *H04N 19/109* (2014.11);
(Continued)

(58) Field of Classification Search
None
See application file for complete search history.

(56) References Cited

U.S. PATENT DOCUMENTS 7,023,916 B1   4/2006   Pandel
7,233,621 B2   6/2007   Jeon
(Continued)

FOREIGN PATENT DOCUMENTS

CA   2 969 723 A1   12/2010
CN   1471320 A     1/2004
(Continued)

OTHER PUBLICATIONS

International Search Report issued Jan. 11, 2011 in PCTUP2010/071178 filed Nov. 26, 2010 (w/English translation).
(Continued)

*Primary Examiner* — Mohammad J Rahman
(74) *Attorney, Agent, or Firm* — Oblon, McClelland, Maier & Neustadt, L.L.P.

(57) ABSTRACT

According to one embodiment, an image encoding method includes selecting a motion reference block from an encoded pixel block to which an inter prediction is applied. The method includes selecting one or more available blocks from the motion reference block. The method includes selecting a selection block from the available blocks. The method includes generating a predicted image of the encoding target block using motion information of the selection block. The method includes encoding a prediction error between the predicted image and an original image. The method includes encoding selection information specifying the selection block by referring to a code table decided according to a number of the available blocks.

4 Claims, 23 Drawing Sheets

Related U.S. Application Data continuation of application No. 16/939,479, filed on Jul. 27, 2020, now Pat. No. 11,265,574, which is a continuation of application No. 16/250,430, filed on Jan. 17, 2019, now Pat. No. 10,779,001, which is a continuation of application No. 16/117,609, filed on Aug. 30, 2018, now Pat. No. 10,542,281, which is a continuation of application No. 15/698,934, filed on Sep. 8, 2017, now Pat. No. 10,091,525, which is a continuation of application No. 15/350,265, filed on Nov. 14, 2016, now Pat. No. 9,906,812, which is a continuation of application No. 13/647,140, filed on Oct. 8, 2012, now Pat. No. 10,009,623, which is a continuation of application No. PCT/JP2010/071178, filed on Nov. 26, 2010.

(51) Int. Cl.

| | | |
|---|---|---|
| *H04N 19/109* | (2014.01) | |
| *H04N 19/119* | (2014.01) | |
| *H04N 19/124* | (2014.01) | |
| *H04N 19/137* | (2014.01) | |
| *H04N 19/139* | (2014.01) | |
| *H04N 19/15* | (2014.01) | |
| *H04N 19/159* | (2014.01) | |
| *H04N 19/176* | (2014.01) | |
| *H04N 19/182* | (2014.01) | |
| *H04N 19/52* | (2014.01) | |
| *H04N 19/61* | (2014.01) | |
| *H04N 19/70* | (2014.01) | |
| *H04N 19/96* | (2014.01) | |

(52) U.S. Cl.
CPC ......... *H04N 19/119* (2014.11); *H04N 19/124* (2014.11); *H04N 19/137* (2014.11); *H04N 19/139* (2014.11); *H04N 19/15* (2014.11); *H04N 19/159* (2014.11); *H04N 19/176* (2014.11); *H04N 19/182* (2014.11); *H04N 19/52* (2014.11); *H04N 19/61* (2014.11); *H04N 19/70* (2014.11); *H04N 19/96* (2014.11)

(56) References Cited

U.S. PATENT DOCUMENTS

| | | | |
|---|---|---|---|
| 7,734,151 | B2 | 6/2010 | Park |
| 8,699,562 | B2 | 4/2014 | Park |
| 9,538,181 | B2 | 1/2017 | Shiodera |
| 10,715,828 | B2 | 7/2020 | Shiodera et al. |
| 10,721,489 | B2 | 7/2020 | Chen |
| 10,999,597 | B2 | 5/2021 | Shiodera et al. |
| 11,889,107 | B2 * | 1/2024 | Shiodera ............ H04N 19/137 |
| 2002/0006162 | A1 | 1/2002 | Nakao et al. |
| 2002/0047919 | A1 | 4/2002 | Kondo |
| 2002/0094028 | A1 | 7/2002 | Kimoto |
| 2003/0020677 | A1 | 1/2003 | Nakano |
| 2003/0081675 | A1 | 5/2003 | Sadeh et al. |
| 2003/0206583 | A1 | 11/2003 | Srinivasan |
| 2004/0001546 | A1 | 1/2004 | Tourapis et al. |
| 2004/0008784 | A1 | 1/2004 | Kikuchi et al. |
| 2004/0013309 | A1 | 1/2004 | Choi |
| 2004/0047418 | A1 | 3/2004 | Tourapis et al. |
| 2004/0057515 | A1 | 3/2004 | Koto et al. |
| 2004/0151252 | A1 | 8/2004 | Sekiguchi |
| 2004/0223548 | A1 | 11/2004 | Kato |
| 2004/0233990 | A1 | 11/2004 | Sekiguchi |
| 2005/0041740 | A1 | 2/2005 | Sekiguchi |
| 2005/0117646 | A1 | 6/2005 | Joch |
| 2005/0123207 | A1 | 6/2005 | Marpe |
| 2005/0147162 | A1 | 7/2005 | Mihara |
| 2005/0201633 | A1 | 9/2005 | Moon et al. |
| 2005/0207490 | A1 | 9/2005 | Wang et al. |
| 2006/0013299 | A1 | 1/2006 | Sato et al. |
| 2006/0045186 | A1 | 3/2006 | Koto et al. |
| 2006/0198444 | A1 | 9/2006 | Wada |
| 2006/0209960 | A1 | 9/2006 | Katayama et al. |
| 2006/0280253 | A1 | 12/2006 | Tourapis et al. |
| 2007/0014358 | A1 | 1/2007 | Tourapis et al. |
| 2007/0019726 | A1 | 1/2007 | Cha |
| 2007/0086525 | A1 | 4/2007 | Asano |
| 2007/0121731 | A1 | 5/2007 | Tanizawa |
| 2007/0146380 | A1 | 6/2007 | Nystad et al. |
| 2007/0160140 | A1 | 7/2007 | Fujisawa |
| 2007/0206679 | A1 | 9/2007 | Lim |
| 2007/0211802 | A1 | 9/2007 | Kikuchi et al. |
| 2008/0002770 | A1 | 1/2008 | Ugur |
| 2008/0008242 | A1 | 1/2008 | Lu et al. |
| 2008/0031328 | A1 | 2/2008 | Kimoto |
| 2008/0037657 | A1 | 2/2008 | Srinivasan |
| 2008/0043842 | A1 | 2/2008 | Nakaishi |
| 2008/0101474 | A1 | 5/2008 | Chiu et al. |
| 2008/0117976 | A1 | 5/2008 | Lu et al. |
| 2008/0152000 | A1 | 6/2008 | Kaushik |
| 2008/0165861 | A1 | 7/2008 | Wen |
| 2008/0181309 | A1 | 7/2008 | Lee et al. |
| 2008/0273599 | A1 | 11/2008 | Park et al. |
| 2009/0003446 | A1 | 1/2009 | Wu |
| 2009/0010553 | A1 | 1/2009 | Sagawa |
| 2009/0022228 | A1 | 1/2009 | Wang |
| 2009/0034618 | A1 | 2/2009 | Fu et al. |
| 2009/0052543 | A1 | 2/2009 | Wu |
| 2009/0067504 | A1 * | 3/2009 | Zheludkov ............ H04N 19/56 375/E7.262 |
| 2009/0074077 | A1 | 3/2009 | Lakus-Becker |
| 2009/0110077 | A1 | 4/2009 | Amano |
| 2009/0116759 | A1 * | 5/2009 | Suzuki ................ H04N 19/587 382/238 |
| 2009/0245376 | A1 | 10/2009 | Choi |
| 2009/0290643 | A1 | 11/2009 | Yang |
| 2009/0304084 | A1 | 12/2009 | Hallapuro et al. |
| 2009/0310682 | A1 | 12/2009 | Chono |
| 2010/0027655 | A1 | 2/2010 | Matsuo |
| 2010/0061447 | A1 | 3/2010 | Tu |
| 2010/0080296 | A1 | 4/2010 | Lee et al. |
| 2010/0086052 | A1 | 4/2010 | Park et al. |
| 2010/0098173 | A1 * | 4/2010 | Horiuchi ............ H04N 19/176 375/240.18 |
| 2010/0118939 | A1 | 5/2010 | Shimizu |
| 2010/0135387 | A1 | 6/2010 | Divorra |
| 2010/0142617 | A1 | 6/2010 | Koo et al. |
| 2010/0158129 | A1 | 6/2010 | Lai |
| 2010/0177824 | A1 | 7/2010 | Koo et al. |
| 2010/0195723 | A1 | 8/2010 | Ikai |
| 2010/0195922 | A1 * | 8/2010 | Amano ................ H04N 19/176 382/233 |
| 2010/0220790 | A1 | 9/2010 | Jeon |
| 2010/0239002 | A1 | 9/2010 | Park |
| 2010/0266042 | A1 | 10/2010 | Koo |
| 2010/0296582 | A1 | 11/2010 | Shimizu |
| 2011/0038420 | A1 | 2/2011 | Lee et al. |
| 2011/0044550 | A1 | 2/2011 | Tian et al. |
| 2011/0080954 | A1 | 4/2011 | Bossen et al. |
| 2011/0090967 | A1 | 4/2011 | Chen |
| 2011/0135006 | A1 | 6/2011 | Yamamoto |
| 2011/0142132 | A1 * | 6/2011 | Tourapis ............ H04N 19/105 375/E7.243 |
| 2011/0142133 | A1 | 6/2011 | Takahashi et al. |
| 2011/0176615 | A1 | 7/2011 | Lee et al. |
| 2011/0194609 | A1 | 8/2011 | Rusert |
| 2011/0206119 | A1 | 8/2011 | Bivolarsky et al. |
| 2011/0206132 | A1 | 8/2011 | Bivolarsky et al. |
| 2011/0211640 | A1 | 9/2011 | Kim |
| 2011/0222601 | A1 | 9/2011 | Suzuki et al. |
| 2011/0243234 | A1 * | 10/2011 | Kondo ................ H04N 19/61 375/E7.123 |
| 2011/0249749 | A1 | 10/2011 | Takahashi |
| 2011/0261882 | A1 * | 10/2011 | Zheng ................ H04N 19/573 375/E7.123 |
| 2011/0261886 | A1 * | 10/2011 | Suzuki ................ H04N 19/523 375/E7.243 |

(56) References Cited

U.S. PATENT DOCUMENTS

| | | | |
|---|---|---|---|
| 2011/0286523 A1 | 11/2011 | Dencher | |
| 2012/0044990 A1 | 2/2012 | Bivolarsky et al. | |
| 2012/0128073 A1 | 5/2012 | Asaka et al. | |
| 2012/0147966 A1 | 6/2012 | Lee et al. | |
| 2012/0169519 A1 | 7/2012 | Ugur | |
| 2012/0281764 A1 | 11/2012 | Lee et al. | |
| 2013/0028328 A1 | 1/2013 | Shiodera et al. | |
| 2013/0058415 A1 | 3/2013 | Lee et al. | |
| 2013/0107962 A1 | 5/2013 | Sim | |
| 2013/0148737 A1 | 6/2013 | Tourapis et al. | |
| 2013/0279593 A1 | 10/2013 | Lee et al. | |
| 2013/0279594 A1 | 10/2013 | Lee et al. | |
| 2014/0016705 A1 | 1/2014 | Lee et al. | |
| 2014/0177727 A1 | 6/2014 | Asaka | |
| 2014/0185685 A1 | 7/2014 | Asaka | |
| 2017/0094311 A1 | 3/2017 | Chou | |
| 2017/0171558 A1 | 6/2017 | Huang | |

FOREIGN PATENT DOCUMENTS

| | | |
|---|---|---|
| CN | 1615656 A | 5/2005 |
| CN | 1692653 A | 11/2005 |
| CN | 1750658 A | 3/2006 |
| CN | 1889687 A | 1/2007 |
| CN | 1898964 A | 1/2007 |
| CN | 101023672 A | 8/2007 |
| CN | 101083770 A | 12/2007 |
| CN | 101099394 A | 1/2008 |
| CN | 101361370 A | 2/2009 |
| CN | 101573984 A | 11/2009 |
| CN | 101631247 A | 1/2010 |
| CN | 101631248 A | 1/2010 |
| EP | 2 149 262 | 2/2010 |
| EP | 2 677 753 A2 | 12/2013 |
| JP | 06-168330 A | 6/1994 |
| JP | 08-018976 A | 1/1996 |
| JP | 10-224800 | 8/1998 |
| JP | 2000-050279 A | 2/2000 |
| JP | 2004-023458 A | 1/2004 |
| JP | 2004-040785 A | 2/2004 |
| JP | 2004-56823 | 2/2004 |
| JP | 2004-104159 A | 4/2004 |
| JP | 2004-165703 A | 6/2004 |
| JP | 2004-208259 A | 7/2004 |
| JP | 2005-124001 A | 5/2005 |
| JP | 4020789 | 10/2007 |
| JP | 2008-278091 A | 11/2008 |
| JP | 2010-010950 A | 1/2010 |
| JP | 2013-517669 A | 5/2013 |
| JP | 2013-517734 A | 5/2013 |
| JP | 5444497 B2 | 12/2013 |
| JP | 2014-90459 | 5/2014 |
| JP | 2014-131293 | 7/2014 |
| JP | 2014-131294 | 7/2014 |
| JP | 2014-131295 | 7/2014 |
| WO | WO 2006/052577 A2 | 5/2006 |
| WO | WO 2008/127597 A2 | 10/2008 |
| WO | WO 2008/133455 A1 | 11/2008 |
| WO | WO 2010/004939 A1 | 1/2010 |
| WO | WO 2010/035370 A1 | 4/2010 |
| WO | WO 2010/146696 A1 | 12/2010 |
| WO | WO 2011/087321 A2 | 7/2011 |
| WO | WO 2011/090314 A2 | 7/2011 |
| WO | WO 2011/125211 A1 | 10/2011 |

OTHER PUBLICATIONS

International Search Report issued Feb. 16, 2010 in PCT/JP2009/071377 filed Dec. 24, 2009 (English translation only).
International Written Opinion issued Jan. 11, 2011 in PCT /JP2010/071178 flied Nov. 26, 2010 (w/English translation).
Takeshi Chujoh, Description of video coding technology proposal by TOSHIBA, Joint Collaborative Team on Video Coding (JCT-VC) of ITU-T SG16 WP3 and ISO/IEC JTC1/SC29/WG11, JCTVC-A117r1, Apr. 15, 2010, pp. 4-6.
Japanese Office Action Issued Apr. 2, 2013 in Patent Application No. 2012-509275 (w/English translation).
Joel Jung et al., "Competition-Based Scheme for Motion Vector Selection and Coding", ITU—Telecommunications Standardization Sector, Study Group 16, Question 6, Jul. 17-18, 2006, 8 pages with cover page.
ITU-T Rec. H.264, Chap. 8.4.1 "Derivation process for motion vector components and reference indices", Marci1 2005, pp. 137-140.
International Preliminary Report on Patentability Issued Nov. 15, 2012 in PCT/JP2010/071178.
Written Opinion of the International Searching Authority Issued Jan. 11, 2011 in PCT/JP2010/071178 (English translation only).
Combined Singapore Examination Report and Search Report issued Apr. 18. 2013 in Patent Application No. 201207534-7.
Japanese Office Action issued Jan. 28, 2014 in Patent Application No. 2013-116884 (w/English translation).
Office Action issued Feb. 25, 2014 in Japanese Patent Application No. 2014-010560 (w/English translation).
Office Action issued Feb. 25, 2014 in Japanese Patent Application No. 2014-010561 (w/English translation).
Office Action issued Feb. 25, 2014 in Japanese Patent Application No. 2014-010562 (w/English translation).
Guillaume Laroche, et al., "RD Optimized Coding for Motion Vector Predictor Selection", IEEE Transactions On Circuits and Systems for Video Technology, vol. 18, No. 9, XP011231739, Sep. 1, 2008, pp. 1247-1257.
"Video Coding Using Extended Block Sizes" Qualcomrn Inc, INTt:.: Rnational Telecommunicationunion, Telecommunication Standardization Sector, Study Period 2009-2012, COM 16-C 123-E, XP-030003764, Jan. 19, 2009, 4 pages.
Sung Deuk Kim, et al., "An Efficient Motion Vector Coding Scheme Based on Minimum Bitrate Prediction", IEEE Transactions On Image Processing, vol. 8, No. 8, Aug. 1, 1999, XP-011026355, pp. 1117-1120.
Extended European Search, Report issued Jun. 17, 2014 in European Patent Application No. 10849496.4.
Japanese Office Action issued Jul. 29, 2014 in Application No. 2013-186629 (w/English translation).
Chinese Office Action issued Sep. 23, 2014 in China Patent Application No. 201080066017.7 (w/English translation).
Chinese Office Action issued Oct. 10, 2014 in China Patent Application No. 201080066019.6 (w/English translation).
Combined Search Report and Examination Report issued Aug. 14, 2015 in Singaporean Patent Application No. 10201502340W.
Japanese Office Action issued Sep. 15, 2015 in Patent Application No. 2014-232881 (w/English translation).
Chinese Office Action issued Aug. 5, 2015 in Patent Application No. 201310142233.0 (w/English translation).
Office Action issued Sep. 6, 2015 to Chinese Patent Application No. 201310142052.8 (w/English translation).
Kemal Ugur, et al., "Appendix to Description of video coding technology proposal by Tandberg Nokia Ericsson", Joint Collaborative Team on Video Coding (JCT-VC), of ITU-T SG16 WP3 and ISO/IEC JTC1/SC29/WG11, No. JCTVC-A119, Apr. 2010, pp. 1-55.
Jungsun Kim, et al., "Encoding complexity reduction for Intra prediction by Disabling NxN Partition", Joint Collaborative Team on Video Coding (JCT-VC) of ITU-T SG16 WP3 and ISO/IEC JTC1/SC29/WG11, No. JCTVC-C218, Oct. 2010, pp. 1-5.
Office Action mailed Jun. 24, 2016 in Chinese Application No. 201410051546.X (w/English translation).
Office Action mailed Jun. 28, 2016 in Chinese Application No. 201410051029.2 (w/English translation).
Office Action mailed Jul. 22, 2016 in Chinese Application No. 201410051514.X (w/English translation).
"Test Model under Consideration", Joint Collaborative Team on Video Coding (JCT-VC) of ITU-T SG16 WP3 and ISO/IEC JTC1/SC29/WG11, 2nd Meeting, Document: JCTVC-B205, Jul. 21-28, 2010. 189 pages.

(56) References Cited

OTHER PUBLICATIONS

Seyoon Jeong et al., "TE11: Cross . . . check result of merge/skip (3.2c)", Joint Collaborative Team on Video Coding (JCT-VC) of ITU-T SG16 WP3 and ISO/IEC JTC1/SC29/WG11, $3^{rd}$ Meeting, Document: JCTVC-C191, Oct. 7-15, 2010, with enclosures: 1) JCTVC-C191-Cross Check Result; 2) JCTVC-C191 Decoding Time r1, and 3) JCTVC-C191 Time Comparison. 28 pages.
Japanese Office Action issued Jan. 31, 2017 in Patent Application No. 2016-028133 (without English translation).
Takeshi Chujoh et al., "Description of video coding technology proposal by Toshiba", Joint Collaborative Team on Video Coding (JCT-VC) of ITU-T SG16 WP3 and ISO/IEC JTC1/SC29/WG11, 1st Meeting: Dresden, DE, Document: „JCTVC-A1 17r1, Apr. 15-23, 2010, pp. 1-6.
Series H: Audiovisual and Multimedia Systems, Infrastructure of audiovisual services—Coding of moving video. High efficiency video coding, Recommendation ITU-T H.265, ITU-T Telecommunication Standardization Sector of ITU, Apr. 2013, 26 pages.
Office Action mailed Feb. 13, 2017 in U.S. Appl. No. 14/190,779, filed Feb. 26, 2014.
Office Action mailed Apr. 18, 2019 in co-pending U.S. Appl. No. 16/117,609, 13 pages.
Notice of Allowance mailed Sep. 5, 2019, in co-pending U.S. Appl. No. 16/117,609, 10 pages.
Office Action mailed May 30, 2019 in co-pending U.S. Appl. No. 15/698,336, 15 pages.
Office Action mailed Jun. 3, 2019 in co-pending U.S. Appl. No. 14/190,779, 12 pages.
Office Action mailed May 8, 2019 in European Patent Application No. 18 152576.7.

\* cited by examiner

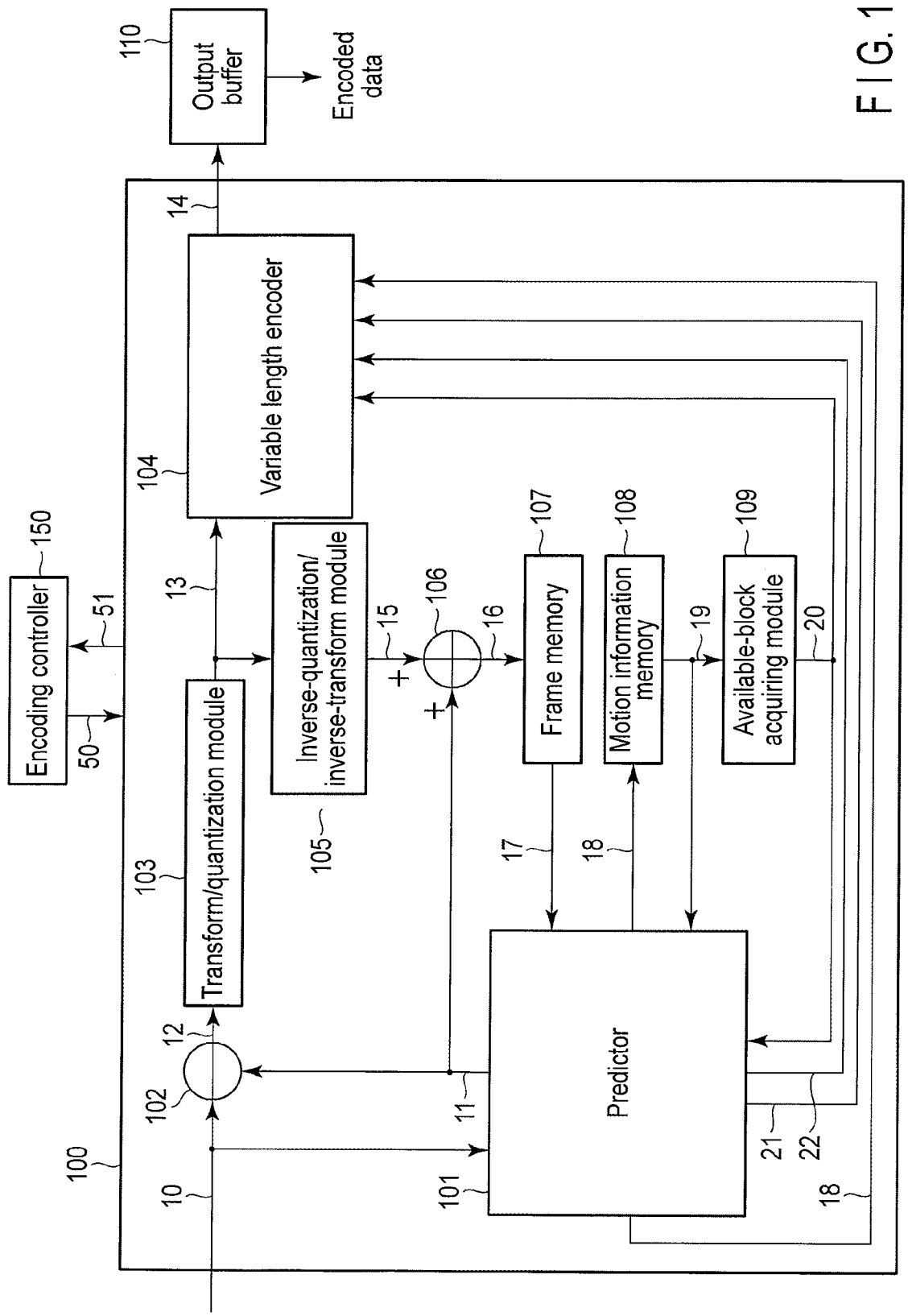
F I G. 1

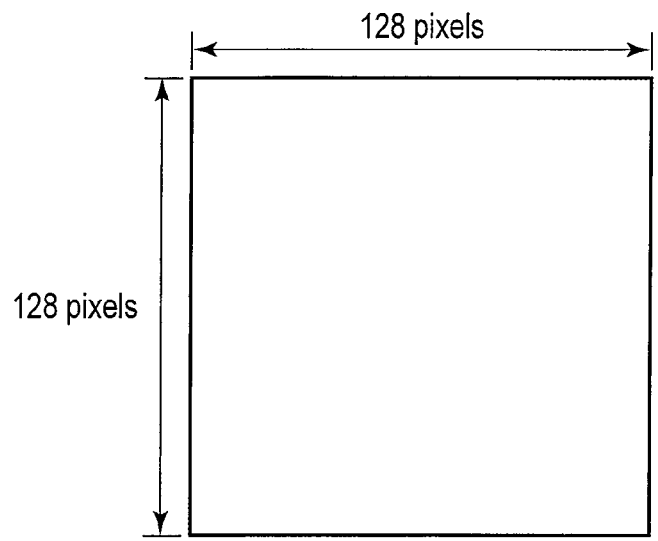
F I G. 2A
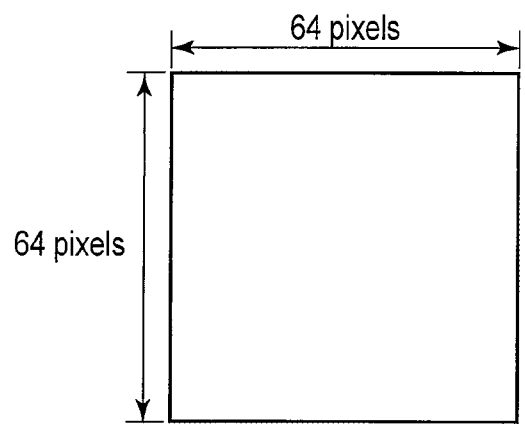
F I G. 2B
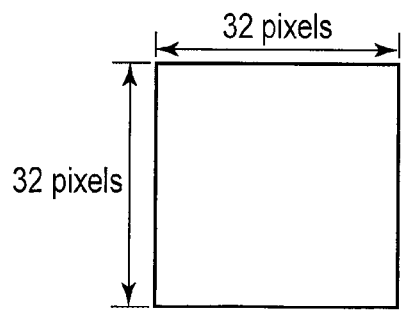
F I G. 2C

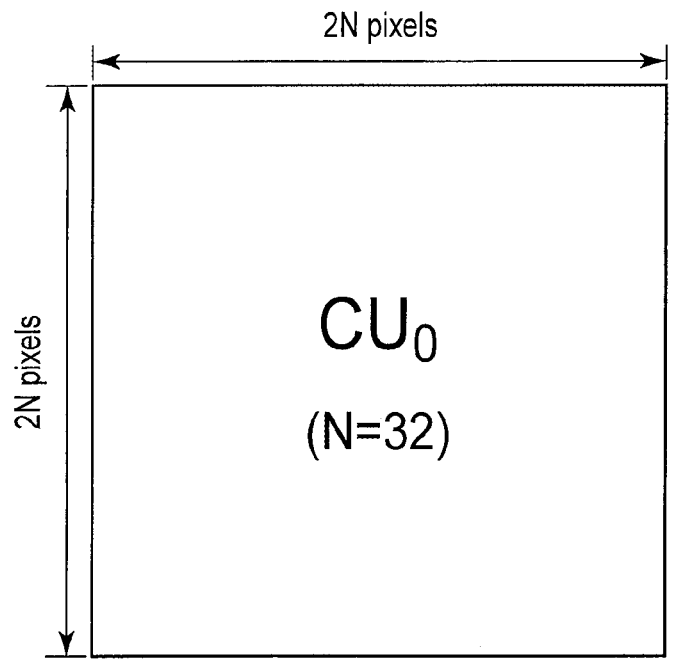
F I G. 3A
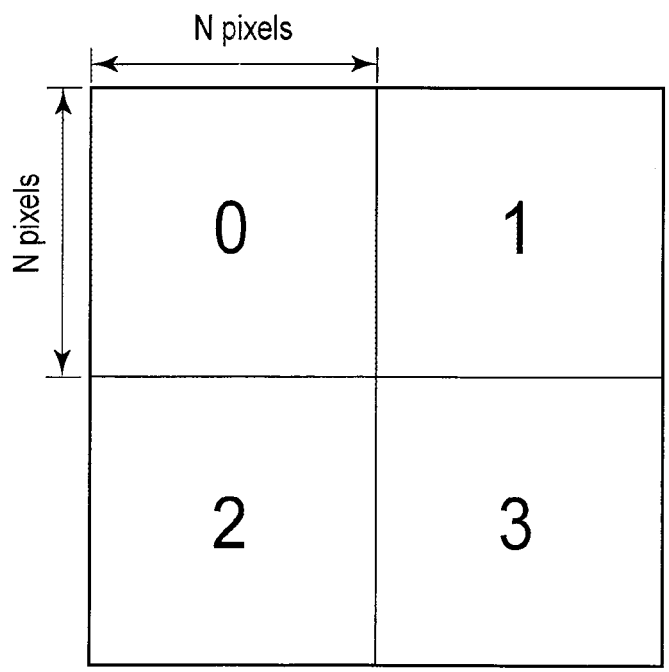
F I G. 3B

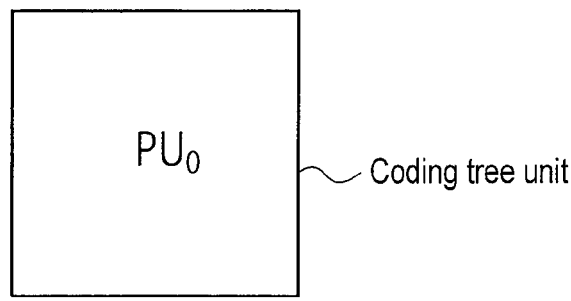
F I G. 5A
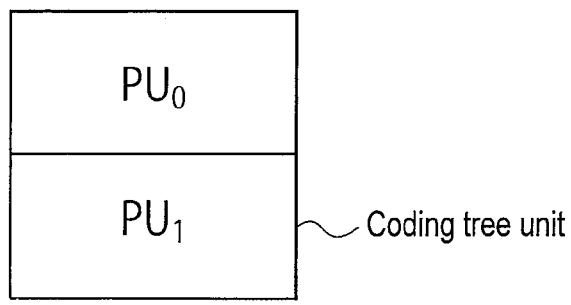
F I G. 5B
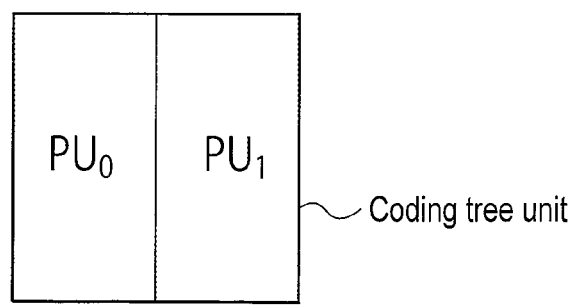
F I G. 5C

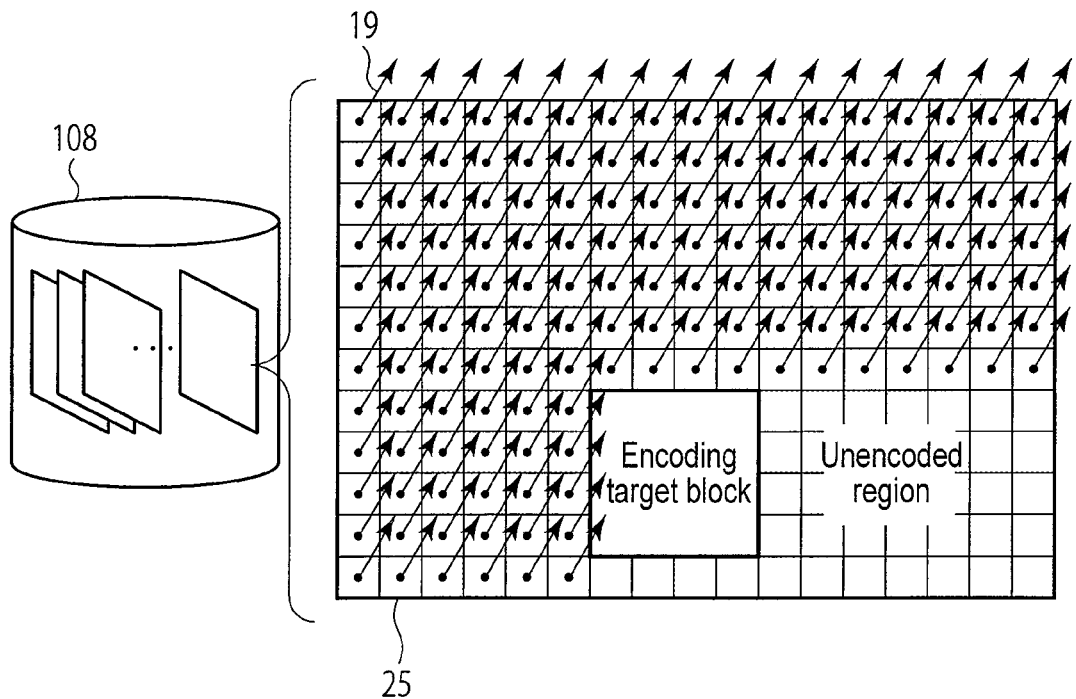
F I G. 6A
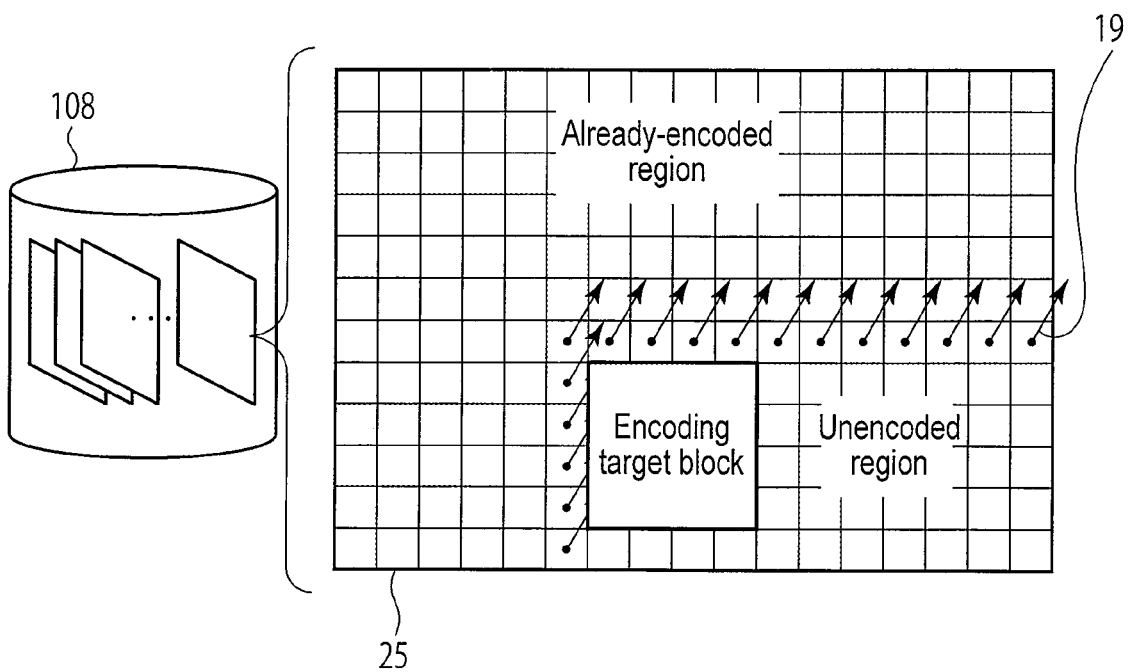
F I G. 6B

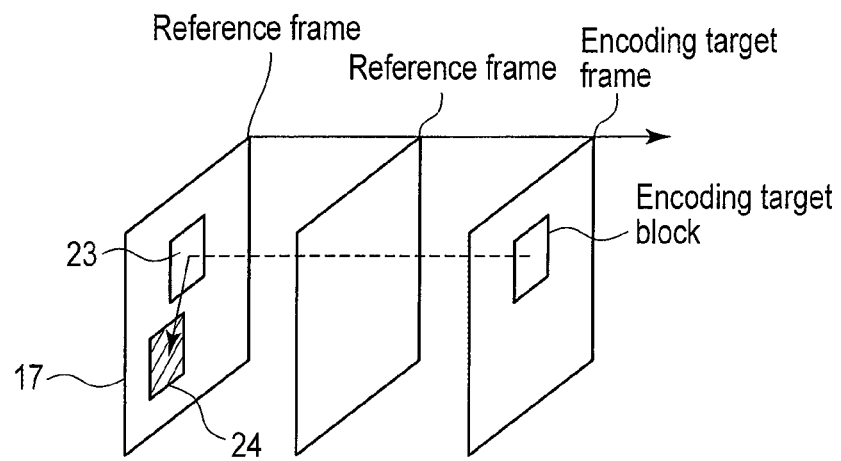
FIG. 8B
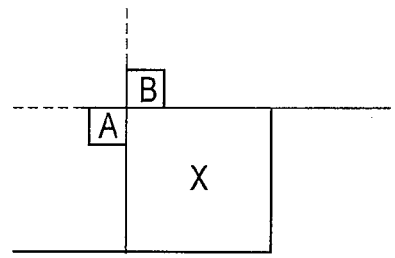
FIG. 9A
|   | dx | dy |
|---|----|----|
| a | -1 | 0  |
| b | 0  | -1 |
FIG. 9B

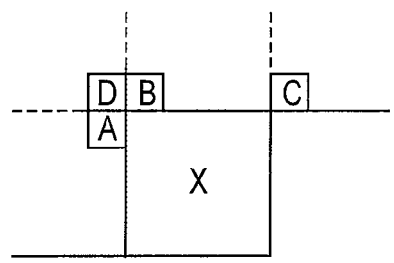
FIG. 9C
|   | dx | dy |
|---|----|----|
| a | -1 | 0  |
| b | 0  | -1 |
| c | N  | -1 |
| d | -1 | -1 |
FIG. 9D
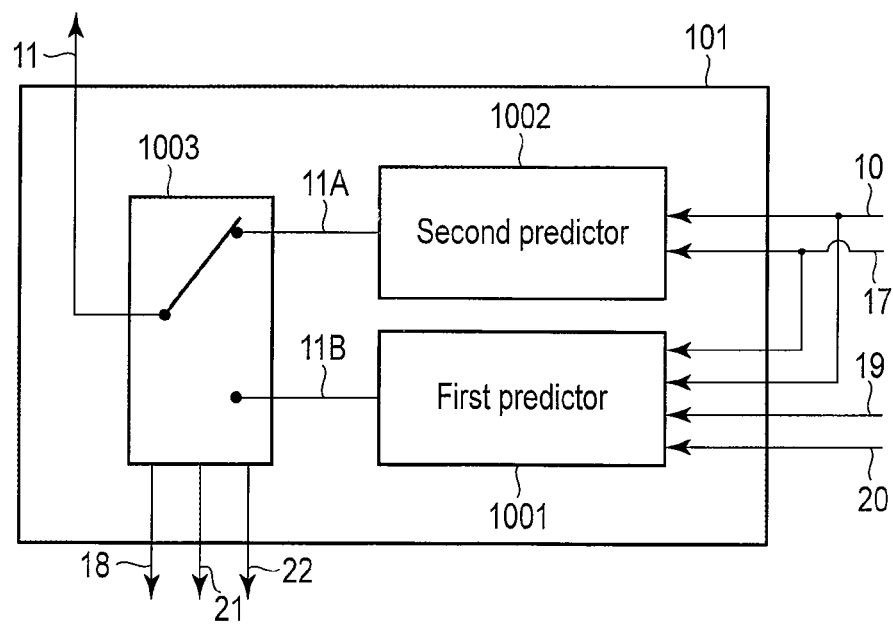
FIG. 10

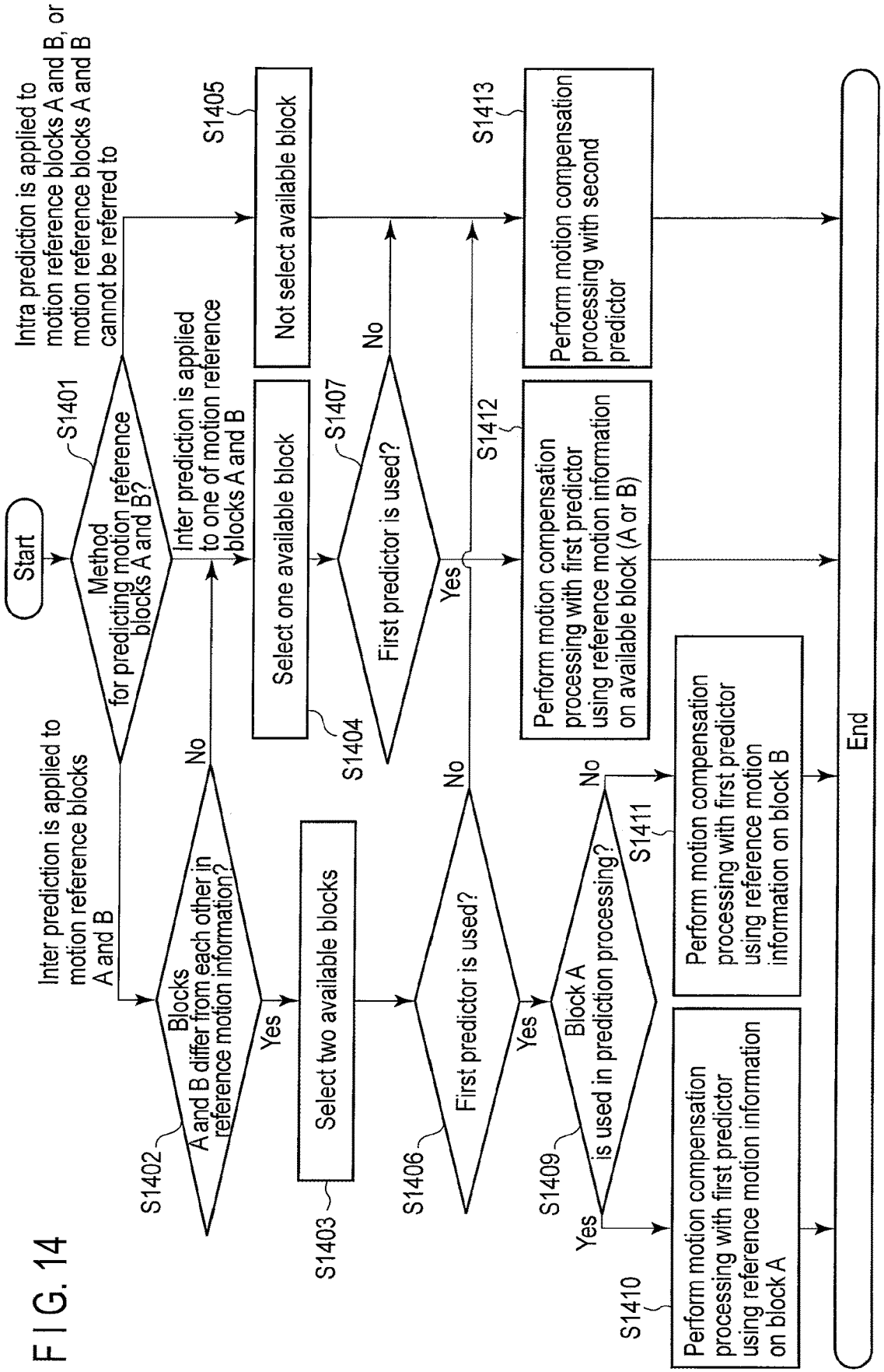
F I G. 14

```
seq_parameter_set_rbsp ( ) {
...
    inter_merge_flag
...
}
```

```
slice_header( ) {
...
  slice_inter_merge_flag
...
}
```

FIG. 17

```
coding_unit( x0, y0, currCodingUnitSize ) {
  if( x0 + currCodingUnitSize < PicWidthInSamples_L &&
      y0 + currCodingUnitSize < PicHeightInSamples_L &&
      currCodingUnitSize > MinCodingUnitSize )
    split_coding_unit_flag
  if( split_coding_unit_flag ) {
    splitCodingUnitSize = currCodingUnitSize >> 1
    ...
    coding_unit( x0, y0, splitCodingUnitSize )
    ...
    coding_unit( x1, y0, splitCodingUnitSize )
    ...
    coding_unit( x0, y1, splitCodingUnitSize )
    ...
    coding_unit( x1, y1, splitCodingUnitSize )
  } else {
    if( NumMergeCandidates > 0 ) {
      merge_flag
      if( merge_flag && NumMergeCandidates > 1 )
        merge_left_flag
      }
    }
    if( !merge_flag ) {
      prediction_unit( x0, y0, currCodingUnitSize )
    }
    if( PredMode != MODE_SKIP ) {
      ...
    }
  }
}
```

FIG. 18

```
prediction_unit( x0, y0, currPredUnitSize ) {
    ...
    if( slice_type != I && NumMergeCandidates > 0 ) {
        merge_flag
        if( merge_flag && NumMergeCandidates > 1 )
            merge_left_flag
    }
    }
    if( !merge_flag ) {
        ...
        pred_mode
        ...
        if( PredMode == MODE_INTRA ) {
            ...
        }
        else if( PredMode == MODE_INTER ) {
            ...
            inter_partitioning_idc
            for( i = 0 ; i < NumPuParts( inter_partitioning_idc ); i ++ ) {
                ...
                ref_idx_l0 [ i ]
                ...
                ref_idx_l1 [ i ]
                ...
                mvd_l0 [ i ] [ 0 ]
                ...
                mvd_l1 [ i ] [ 1 ]
                ...
            }
        }
        ...
    }
}
```

FIG. 19

```
coding_unit( x0, y0, currCodingUnitSize ) {
    if( x0 + currCodingUnitSize < PicWidthInSamples_L &&
        y0 + rCodingUnitSize < PicHeightInSamples_L &&
        currCodingUnitSize > MinCodingUnitSize )
        split_coding_unit_flag
    if( split_coding_unit_flag ) {
        split_CodingUnitSize = currCodingUnitSize >> 1
        ...
        coding_unit( x0, y0, splitCodingUnitSize )
        ...
        coding_unit( x1, y0, splitCodingUnitSize )
        ...
        coding_unit( x0, y1, splitCodingUnitSize )
        ...
        coding_unit( x1, y1, splitCodingUnitSize )
    } else {
        if( merge_available_size(currCodingUnitSize) )
            if( NumMergeCandidates > 0 ) {
                merge_flag
                if( merge_flag && NumMergeCandidates > 1 )
                    merge_left_flag
            }
        }
        if( !merge_flag ) {
            prediction_unit( x0, y0, currCodingUnitSize )
        }
        if( PredMode != MODE_SKIP ) {
            ...
        }
    }
}
```

FIG. 20

```
prediction_unit( x0, y0, currPredUnitSize ) {
    if( slice_type != I )
        skip_flag
    if( skip_flag ) {
        ...
    }
    elce {
        ...
        pred_mode
        ...
        if( PredMode == MODE_INTRA ) {
            ...
        }
        else if( PredMode == MODE_INTER ) {
            ...
            inter_partitioning_idc
            for( i = 0 ; i < NumPuParts( inter_partitioning_idc ); i ++ ) {
                if( NumMergeCandidates > 0 ) {
                    merge_flag[ i ]
                    if( merge_flag[ i ] && NumMergeCandidates > 1 )
                        merge_left_flag[ i ]
                }
                if( !merge_flag[ i ] ) {
                    ...
                    ref_idx_l0 [ i ]
                    ...
                    ref_idx_l1 [ i ]
                    ...
                    mvd_l0 [ i ] [ 0 ]
                    ...
                    mvd_l1 [ i ] [ 1 ]
                    ...
                }
            }
        }
        ...
    }
}
```

FIG. 21

IMAGE ENCODING METHOD AND IMAGE DECODING METHOD

CROSS REFERENCE TO RELATED APPLICATIONS

This application is a continuation of and claims the benefit of priority under 35 U.S.C. § 120 from U.S. application Ser. No. 17/573,020, filed Jan. 11, 2022, which is a continuation of and claims the benefit of priority under 35 U.S.C. § 120 from U.S. application Ser. No. 16/939,479 (U.S. Pat. No. 11,265,574), filed Jul. 27, 2020, which is a continuation of and claims the benefit of priority under 35 U.S.C. § 120 from U.S. application Ser. No. 16/250,430 (U.S. Pat. No. 10,779,001), filed Jan. 17, 2019, which is a continuation of and claims the benefit of priority under 35 U.S.C. § 120 from U.S. application Ser. No. 16/117,609 (U.S. Pat. No. 10,542,281), filed Aug. 30, 2018, which is a continuation of and claims the benefit of priority under 35 U.S.C. § 120 from U.S. application Ser. No. 15/698,934 (U.S. Pat. No. 10,091,525), filed Sep. 8, 2017, which is a continuation of and claims the benefit of priority under 35 U.S.C. § 120 from U.S. application Ser. No. 15/350,265 (U.S. Pat. No. 9,906,812), filed Nov. 14, 2016, which is a continuation of U.S. application Ser. No. 13/647,140 (U.S. Pat. No. 10,009,623), filed Oct. 8, 2012, which is a continuation of PCT/JP2010/071178 filed Nov. 26, 2010 and claims the benefit of priority from International Application PCT/JP2010/056400 filed Apr. 8, 2010, the entire contents of each of which are incorporated herein by reference.

FIELD

Embodiments described herein relate generally to an image encoding method and an image decoding method.

BACKGROUND

Recently, a moving image coding method in which a encoding efficiency is largely improved is recommended as ITU-T Rec. H.264 and ISO/IEC 14496-10 (hereinafter referred to as H.264) by ITU-T and ISO/IEC. In H.264, prediction processing, transform processing, and entropy coding processing are performed in rectangular block units (for example, a 16-by-16 pixel block unit and an 8-by-8 pixel block unit). In the prediction processing, motion compensation is performed to a rectangular block of an encoding target (hereinafter referred to as an encoding target block). In the motion compensation, a prediction in a temporal direction is performed by referring to an already-encoded frame (hereinafter referred to as a reference frame). In the motion compensation, it is necessary to encode and transmit motion information including a motion vector to a decoding side. The motion vector is information on a spatial shift between the encoding target block and a block referred to in the reference frame. In the case that the motion compensation is performed using a plurality of reference frames, it is necessary to encode a reference frame number in addition to the motion information. Therefore, an code amount related to the motion information and the reference frame number may increase.

A direct mode, in which the motion vector to be allocated to the encoding target block is derived from the motion vectors allocated to the already-encoded blocks and the predicted image is generated based on the derived motion vector, is cited as an example of a method for evaluating the motion vector in motion compensation prediction (see JP-B 4020789 and U.S. Pat. No. 7,233,621). In the direct mode, because the motion vector is not encoded, the code amount of the motion information can be reduced. For example, the direct mode is adopted in H.264/AVC.

In the direct mode, the motion vector of the encoding target block is predicted and generated by a fixed method for calculating the motion vector from a median of the motion vectors of the already-encoded blocks adjacent to the encoding target block. Therefore, the motion vector calculation has a low degree of freedom.

A method for selecting one already-encoded block from the already-encoded blocks to allocate the motion vector to the encoding target block has been proposed in order to enhance the degree of freedom of the motion vector calculation. In the method, it is necessary to always transmit selection information identifying the selected block to the decoding side such that the decoding side can identify the selected already-encoded block. Accordingly, the code amount related to the selection information increases in the case that the motion vector to be allocated to the encoding target block is decided by selecting one already-encoded block from the already-encoded blocks.

BRIEF DESCRIPTION OF THE DRAWINGS

FIG. 1 is a block diagram schematically illustrating an image encoding apparatus according to a first embodiment;

FIG. 2A is a view illustrating an example of a size of a coding tree unit;

FIG. 2B is a view illustrating another example of the size of the coding tree unit;

FIG. 2C is a view illustrating still another example of the size of the coding tree unit;

FIG. 3A is a view illustrating an example of the coding tree unit;

FIG. 3B is a view illustrating a state of quadtree segmentation of the coding tree unit in FIG. 3A;

FIG. 5A is a view illustrating an example of a prediction unit;

FIG. 5B is a view illustrating another example of the prediction unit;

FIG. 5C is a view illustrating still another example of the prediction unit;

FIG. 6A is a view illustrating an example of a motion information memory in FIG. 1;

FIG. 6B is a view illustrating another example of the motion information memory in FIG. 1;

FIG. 8B is a view illustrating another example of the inter prediction processing performed by the image encoding apparatus in FIG. 1;

FIG. 9A is a view illustrating an example of a position of a motion reference block;

FIG. 9B is a view illustrating a relative position of the motion reference block in FIG. 9A with respect to an encoding target block;

FIG. 9C is a view illustrating another example of the position of the motion reference block;

FIG. 9D is a view illustrating the relative position of the motion reference block in FIG. 9C with respect to the encoding target block;

FIG. 10 is a view illustrating detail of predictor in FIG. 1;

FIG. 14 is a flowchart illustrating an example of an operation of the predictor in FIG. 1;

FIG. 17 is a view illustrating an example of a slice head syntax of the first embodiment;

FIG. 18 is a view illustrating an example of a coding tree unit syntax of the first embodiment;

FIG. 19 is a view illustrating an example of a prediction unit syntax of the first embodiment;

FIG. 20 is a view illustrating another example of the coding tree unit syntax of the first embodiment;

FIG. 21 is a view illustrating an example of a prediction unit syntax according to a second embodiment;

DETAILED DESCRIPTION

Figure 2D:
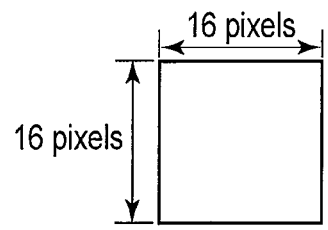
FIG. 2D is a view illustrating still another example of the size of the coding tree unit.

In general, according to one embodiment, an image encoding method includes selecting a motion reference block from an already-encoded pixel block to which an inter prediction is applied, the motion reference block including a first motion reference block that is spatially adjacent to an encoding target block in an upward direction and a second motion reference block that is spatially adjacent to the encoding target block in a left direction. The method includes selecting one or more available blocks from the motion reference block, the available blocks each including a candidate of motion information applied to the encoding target block and different motion information. The method includes selecting a selection block from the available blocks. The method includes generating a predicted image of the encoding target block using motion information of the selection block. The method includes encoding a prediction error between the predicted image and an original image. The method includes encoding selection information specifying the selection block by referring to a code table decided according to a number of the available blocks.

Embodiments provide image encoding and image decoding methods having a high encoding efficiency.

Hereinafter, image encoding methods and image decoding methods according to embodiments will be described with reference to the drawings. In the following description, a term of "image" can appropriately be replaced with terms, such as "video picture", "pixel", "image signal", and "image data". In the embodiments, like reference numbers denote like elements, and duplicated explanations will be avoided.

First Embodiment

FIG. 1 schematically illustrates an image encoding apparatus according to a first embodiment. As illustrated in FIG. 1, the image encoding apparatus includes an image encoder 100, an encoding controller 150, and an output buffer 110. The image encoding apparatus in FIG. 1 may be realized by hardware, such as an LSI chip, or realized by causing a computer to execute an image encoding program.

For example, an input image signal 10 of a moving image or a still image is input to the image encoder 100 in a unit of each of the pixel blocks into which an original image is divided. The image encoder 100 performs compression encoding of the input image signal 10 to generate encoded data 14. The generated encoded data 14 is temporarily stored in the output buffer 110, and transmitted to a storage system (a storage media, not illustrated) or a transmission system (a communication line, not illustrated) at an output timing managed by the encoding controller 150.

The encoding controller 150 controls the entire encoding processing of the image encoder 100, namely, feedback control of a generated code amount, quantization control, prediction mode control, and entropy encoding control. Specifically, the encoding controller 150 provides encoding control information 50 to the image encoder 100, and properly receives feedback information 51 from the image encoder 100. The encoding control information 50 includes prediction information, motion information 18, and quantization parameter information. The prediction information includes prediction mode information and block size information. The motion information 18 includes a motion vector, a reference frame number, and a prediction direction (a unidirectional prediction and a bidirectional prediction). The quantization parameter information includes a quantization parameter, such as a quantization width (or a quantization step size), and a quantization matrix. The feedback information 51 includes the generated code amount by the image encoder 100. For example, the feedback information 51 is used to decide the quantization parameter.

The image encoder 100 encodes the input image signal 10 in pixel block units (for example, a coding tree unit, a macroblock, a sub-block, and one pixel). Therefore, the input image signal 10 is sequentially input to the image coding unit 100 in units of pixel blocks into which the original image is divided. In the present embodiment, by way of example, a processing unit for encoding is the coding tree unit, and the coding tree unit that is of an encoding target is referred to as an encoding target block.

The processing unit for encoding is not limited to the coding tree unit, but the macroblock, the sub-block, or one pixel may be used as the processing unit for encoding. In the following description, the coding tree unit can be replaced with the macroblock, the sub-block, or one pixel. In the first embodiment, an image frame including the encoding target block, namely the image frame of the encoding target is referred to as an encoding target frame.

Figure 2E:
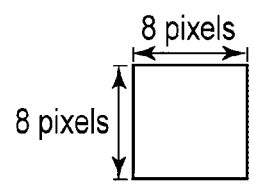
FIG. 2E is a view illustrating still another example of the size of the coding tree unit.
Figure 2F:
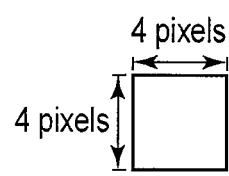
FIG. 2F is a view illustrating still another example of the size of the coding tree unit.

Typically, the coding tree unit is a 128-by-128-pixel block in FIG. 2A, a 64-by-64-pixel block in FIG. 2B, a 32-by-32-pixel block in FIG. 2C, a 16-by-16-pixel block in FIG. 2D, an 8-by-8-pixel block in FIG. 2E, and a 4-by-4-pixel block in FIG. 2F.

The coding tree unit is not limited to the pixel blocks in FIGS. 2A to 2F, and the coding tree unit may be a pixel block larger than the 128-by-128-pixel block or the pixel block smaller than the 4-by-4-pixel block. A shape of the coding tree unit is not limited to a square in FIGS. 2A to 2F, and the coding tree unit may be set to any shape, such as a rectangular pixel block (an N-by-M-pixel block) of a 32-by-16-pixel block.

Figure 3C:
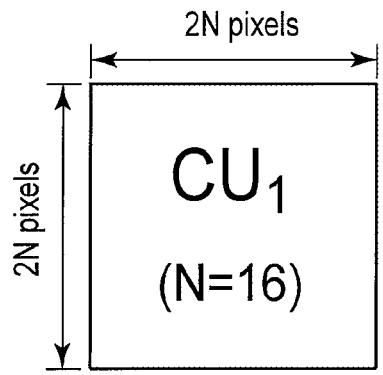
FIG. 3C is a view illustrating another example of the coding tree unit.

FIGS. 3A to 3D illustrate specific examples of the coding tree unit. FIG. 3A illustrates a 64-by-64-pixel coding tree unit $CU_0$. In the present embodiment, the size of the coding tree unit is defined as 2N×2N pixels. N indicates the size of the coding tree unit that is of a reference. N=32 in the coding tree unit $CU_0$ in FIG. 3A.

The coding tree unit $CU_0$ has a quadtree structure, and the coding tree unit $CU_0$ can be divided into four pixel blocks each of which has N×N pixels. In the case that the coding tree unit is divided, an index is provided to the four pixel blocks in the Z-scan order. FIG. 3B illustrates an example of quadtree segmentation of the 64-by-64-pixel block in FIG. 3A. Numbers of 0 to 3 in FIG. 3B indicate the order of the Z-scan. In the coding tree unit, the quadtree segmentation of the pixel block obtained by the quadtree segmentation can recursively be performed. In the present embodiment, a depth of the segmentation is defined by Depth. The coding tree unit $CU_0$ in FIG. 3A has Depth=0.

Figure 3D:
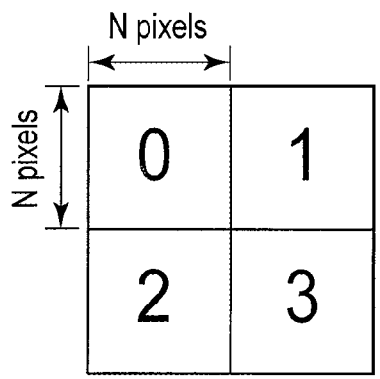
FIG. 3D is a view illustrating a state of the quadtree segmentation of the coding tree unit in FIG. 3C.

FIG. 3C illustrates a coding tree unit $CU_1$ having Depth=1. The size of the coding tree unit $CU_1$ is 32×32 pixels (N=16). In the case of the quadtree segmentation of the coding tree unit $CU_1$, the coding tree unit $CU_1$ is divided into four pixel blocks each of which has 16×16 pixels as illustrated in FIG. 3D. Similarly, the coding tree unit (not illustrated) of Depth=2 has the size of 16×16 pixels (N=8), and can be divided into the four 8-by-8-pixel pixel blocks. The size of coding tree unit decreases with increasing depth Depth of the division.

The largest unit of the coding tree unit is referred to as a large coding tree unit, and the input image signal 10 is sequentially input and encoded in this unit. In a typical example, the size of the large coding tree unit is set to 64×64 pixels (N=32), the size of the minimum coding tree unit is set to 8×8 pixels (N=4), and the quadtree segmentation of the coding tree unit is recursively performed. Each of the large coding tree unit and the minimum coding tree unit may have any size as long as the size of the large coding tree unit is greater than or equal to that of the minimum coding tree unit. The sizes of the large coding tree unit and the minimum coding tree unit may be changed in each sequence, picture, slice, and region in the slice. The sizes of the large coding tree unit and the minimum coding tree unit may adaptively be switched according to slice types, such as an I-slice, a B-slice, and a P-slice.

Figure 4:
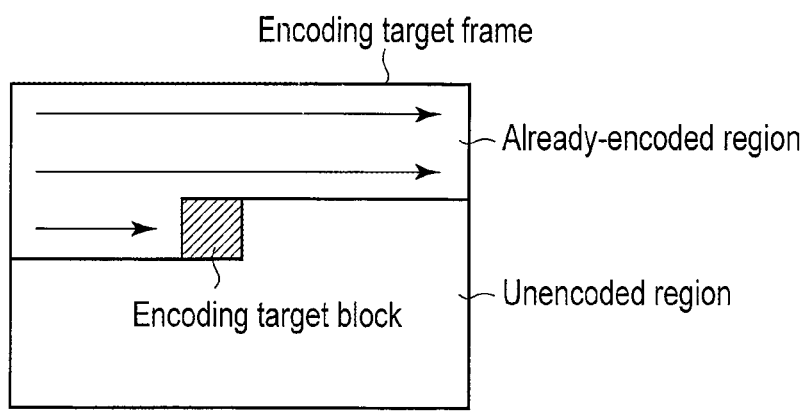
FIG. 4 is a view illustrating a predictive encoding procedure of a pixel block.

The encoding processing may be performed to each coding tree unit in the encoding target frame in any order. In the present embodiment, for the sake of convenience, it is assumed that, as illustrated in FIG. 4, the encoding processing is performed from the coding tree unit of the upper left of the encoding target frame toward the coding tree unit of the lower right, namely, in the raster-scan order.

The image encoder 100 of the present embodiment can perform prediction processing in a pixel block unit called a prediction unit. Typically, the prediction unit is the same pixel block as the coding tree unit or each of the pixel blocks into which the coding tree unit is divided.

The prediction unit may be a pixel block having a shape different from that of the coding tree unit. The prediction unit may be a pixel block having a size larger than that of the coding tree unit.

Figure 5D:
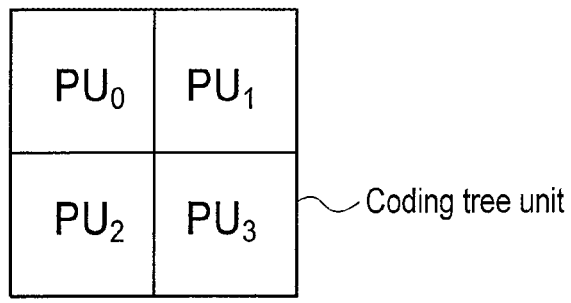
FIG. 5D is a view illustrating still another example of the prediction unit.

FIGS. 5A to 5I illustrate specific examples of the prediction unit. FIGS. 5A to 5I illustrate the prediction unit having a pixel block $PU_x$ (x=0, 1, 2, and 3). FIG. 5A illustrates an example in which the size of the prediction unit is equal to that of the coding tree unit. In this case, one prediction unit PU0 exists in the coding tree unit.

FIGS. 5B to 5I illustrate examples in each of which a plurality of prediction units exist in the coding tree unit. In FIGS. 5B and 5C, two prediction units $PU_0$ and $PU_1$ exist in the coding tree unit. In FIG. 5B, the prediction units $PU_0$ and $PU_1$ are two pixel blocks into which the coding tree unit is vertically divided. In FIG. 5C, the prediction units $PU_0$ and $PU_1$ are two pixel blocks into which the coding tree unit is horizontally divided. FIG. 5D illustrates an example in which the prediction units are the four pixel blocks into which the coding tree unit is divided.

Figure 5E:
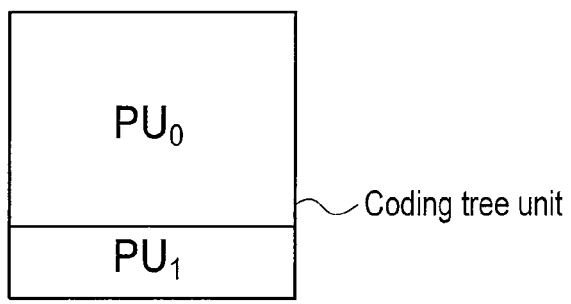
FIG. 5E is a view illustrating still another example of the prediction unit.
Figure 5F:
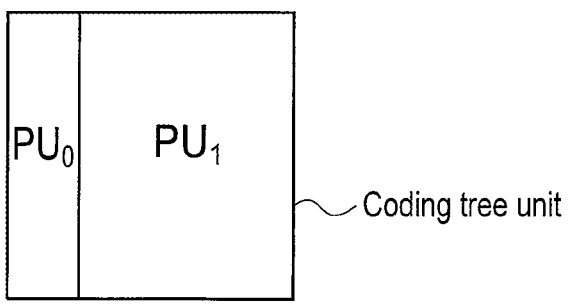
FIG. 5F is a view illustrating still another example of the prediction unit.
Figure 5G:
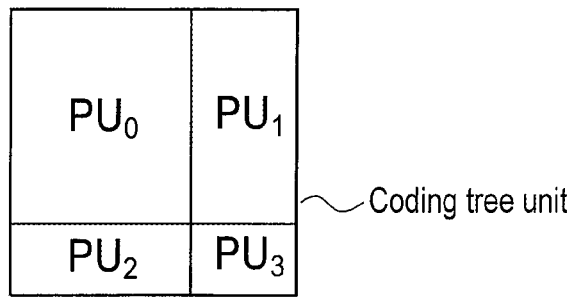
FIG. 5G is a view illustrating still another example of the prediction unit.
Figure 5H:
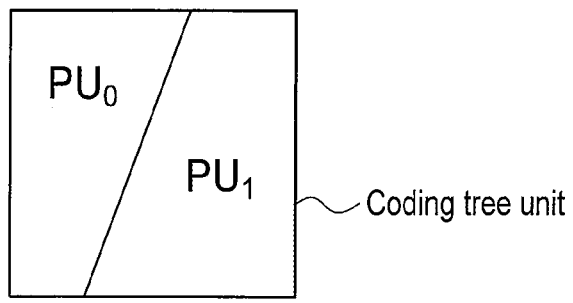
FIG. 5H is a view illustrating still another example of the prediction unit.
Figure 5I:
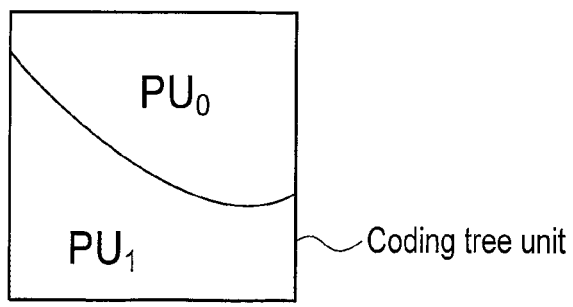
FIG. 5I is a view illustrating still another example of the prediction unit.

The block sizes of the prediction units existing in the coding tree unit may be different from each other as illustrated in FIGS. 5E, 5F, and 5G. As illustrated in FIGS. 5H and 5I, the prediction unit may be a pixel block that is obtained by dividing the coding tree unit into line segments or curves, such as arcs.

The image encoder 100 in FIG. 1 will be described in detail.

The image encoder 100 in FIG. 1 includes a predictor 101, a subtractor 102, a transform/quantization module 103, a variable length encoder 104, an inverse-quantization/inverse-transform module 105, an adder 106, a frame memory 107, a motion information memory 108, and an available-block acquiring module 109.

In the image encoder 100, the input image signal 10 is provided to the predictor 101 and the subtractor 102. The subtractor 102 receives the input image signal 10, and receives a predicted image signal 11 from the predictor 101. The subtractor 102 calculates a difference between the input image signal 10 and the predicted image signal 11 to generate a prediction error image signal 12.

The transform/quantization module 103 receives the prediction error image signal 12 from the subtractor 102, and performs transform processing to the received prediction error image signal 12 to generate a transform coefficient. For example, the transform processing is an orthogonal transform, such as a discrete cosine transform (DCT). Alternatively, the transform/quantization module 103 may generate the transform coefficient using techniques, such as a wavelet transform and an independent component analysis, instead of the discrete cosine transform. Then the transform/quantization module 103 quantizes the generated transform coefficient based on the quantization parameter provided by the encoding controller 150. The quantized transform coefficient (also called transform coefficient information) 13 is transmitted to the variable length encoder 104 and the inverse-quantization/inverse-transform module 105.

The inverse-quantization/inverse-transform module 105 inversely quantizes the quantized transform coefficient 13 based on the quantization parameter provided by the encoding controller 150, namely, the quantization parameter that is identical to that of the transform/quantization module 103. Then the inverse-quantization/inverse-transform module 105 performs an inverse transform to the inversely-quantized transform coefficient to generate a decoded prediction error signal 15. The inverse transform processing performed by the inverse-quantization/inverse-transform module 105 is matched with the inverse transform processing of the transform processing performed by the transform/quantization module 103. For example, when the DCT is the transform processing performed by the transform/quantization module 103, an inverse discrete cosine transform (IDCT) is the inverse transform processing performed by the inverse-quantization/inverse-transform module 105. When the wavelet transform is the transform processing performed by the transform/quantization module 103, an inverse wavelet transform is the inverse transform processing performed by the inverse-quantization/inverse-transform module 105.

The adder 106 receives the decoded prediction error signal 15 from the inverse-quantization/inverse-transform module 105, and receives the predicted image signal 11 from the predictor 101. The adder 106 adds the decoded prediction error signal 15 and the predicted image signal 11 to generate a locally-decoded image signal 16. The generated locally-decoded image signal 16 is stored as a reference image signal 17 in the frame memory 107. The reference image signal 17 stored in the frame memory 107 is read and referred to by the predictor 101 in encoding the encoding target block.

The predictor 101 receives the reference image signal 17 from the frame memory 107, and receives the available block information 20 from the available-block acquiring module 109. The predictor 101 receives reference motion information 19 from the motion information memory 108. The predictor 101 generates the predicted image signal 11, the motion information 18, selection block information 21, and prediction switching information 22 based on the reference image signal 17, the reference motion information 19, and the available block information 20. The predicted image signal 11 is transmitted to the subtractor 102 and the adder 106. The motion information 18 is transmitted to the variable length encoder 104, and stored in the motion information memory 108 for the purpose of the prediction processing performed to the subsequent encoding target block. The selection block information 21 and the prediction switching information 22 are transmitted to the variable length encoder 104. The predictor 101 is described in detail later.

The motion information 18 is temporarily stored as the reference motion information 19 in the motion information memory 108. FIG. 6A illustrates an example of the motion information memory 108. As illustrated in FIG. 6A, the pieces of reference motion information 19 are retained in frames in the motion information memory 108, and form a motion information frame 25.

FIG. 6A also illustrates an example of the motion information frame 25 of the encoding target frame, wherein the pieces of motion information 18 of the already-encoded coding tree unit and the prediction unit are stored as the pieces of reference motion information 19.

FIG. 6B illustrates another example of the motion information memory 108. In FIG. 6B, only the pieces of reference motion information 19 of the pixel blocks adjacent to the encoding target block are retained. In the case that only the pieces of reference motion information 19 of the pixel blocks adjacent to the encoding target block are retained, a capacity of memory can be reduced compared with the case that the pieces of reference motion information 19 of all the already-encoded pixel blocks are retained as illustrated in FIG. 6A.

The pieces of reference motion information 19 are retained in the motion information frame 25 in a unit of a predetermined region (for example, in a unit of 4-by-4-pixel block). The reference motion information 19 includes information indicating whether the region is encoded by an inter prediction or an intra prediction. Like a skip mode and a direct mode, which are defined in H.264, the motion information on the coding tree unit (or the prediction unit) is retained as the reference motion information 19 even in the case that the inter prediction of the coding tree unit (or the prediction unit) is performed without encoding a value of the motion vector using the motion information predicted from the already-encoded region.

The motion information memory 108 is not limited to the example in which the pieces of reference motion information 19 are retained in a unit of 4-by-4-pixel block, and the pieces of reference motion information 19 may be retained in another pixel block unit. For example, the unit of the pixel block in which the reference motion information 19 is retained may be one pixel or a 2-by-2-pixel block. The shape of the pixel block in which the reference motion information 19 is retained is not limited to the square, and the pixel block may have any shape.

The variable length encoder 104 in FIG. 1 receives the transform coefficient information 13 from the transform/quantization module 103, receives the motion information 18, the selection block information 21, and the prediction switching information 22 from the predictor 101, receives the prediction information and encoding parameters, such as the quantization parameter, from the encoding controller 150, and receives the available block information 20 from the available-block acquiring module 109. The variable length encoder 104 performs entropy encoding (for example, fixed length coding, Huffman coding, and arithmetic coding) to the transform coefficient information 13, the motion information 18, the selection block information 21, the prediction switching information 22, and the encoding parameters, and multiplexes them to generate the encoded data 14.

Figure 7:
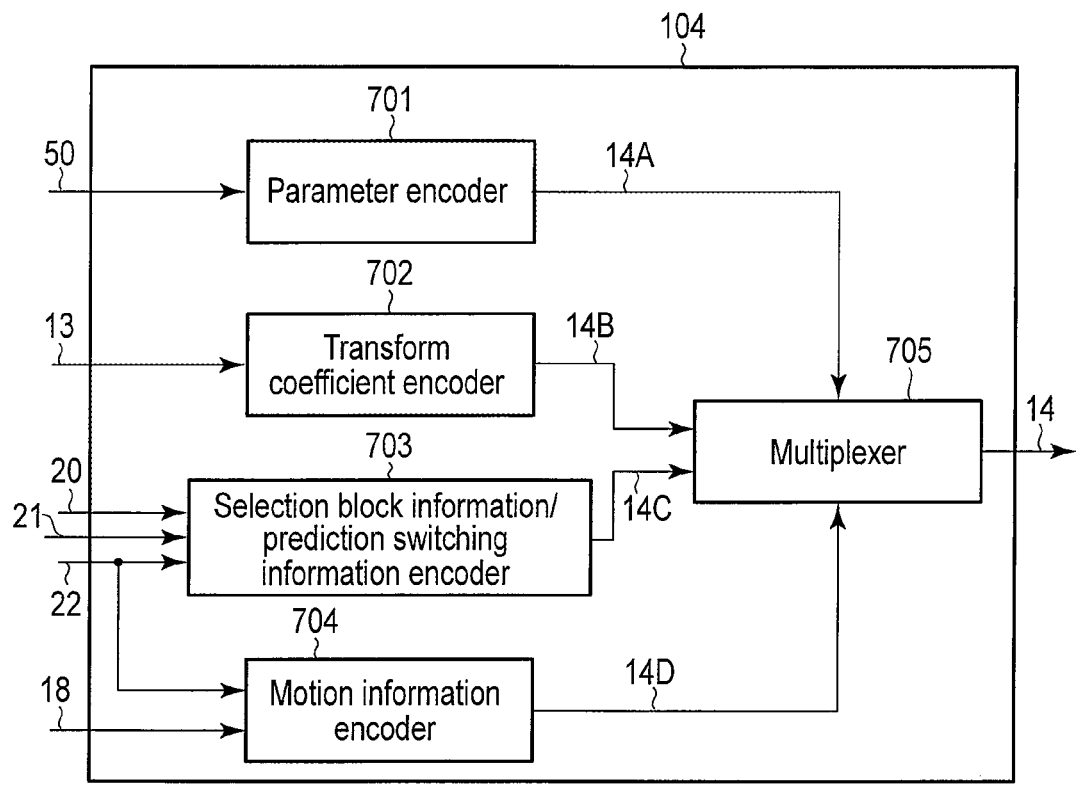
FIG. 7 is a block diagram illustrating detail of variable length encoder in FIG. 1.

Specifically, as illustrated in FIG. 7, the variable length encoder 104 includes a parameter encoder 701, a transform coefficient encoder 702, a selection block information/prediction switching information encoder 703, a motion information encoder 704, and a multiplexer 705. The parameter encoder 701 encodes the encoding parameters received from the encoding controller 150, and generates encoded data 14A. The transform coefficient encoder 702 encodes the transform coefficient information 13 received from the transform/quantization module 103, and generates encoded data 14B.

Based on the available block information 20 received from the available-block acquiring module 109, the selection block information/prediction switching information encoder 703 encodes the selection block information 21 and the prediction switching information 22, which are received from the predictor 101, and generates encoded data 14C. Based on the prediction switching information 22 received from the predictor 101, the motion information encoder 704 encodes the motion information 18 received from the predictor 101, and generates encoded data 14D.

The multiplexer 705 multiplexes the pieces of encoded data 14A, 14B, 14C, and 14D to generate the encoded data 14. In addition to the selection block information 21, the prediction switching information 22, and the prediction information, the generated encoded data 14 includes all parameters, such as information on the transform coefficient and information on the quantization, which are necessary for the decoding. The encoded data 14 is temporarily stored in the output buffer 110 and then transmitted to the storage system (not illustrated) or the transmission system (not illustrated).

The motion information encoder 704 is not used when a first predictor 1001 (illustrated in FIG. 10) performs the prediction processing. The selection block information/prediction switching information encoder 703 is not used when a second predictor 1002 (illustrated in FIG. 10) performs the prediction processing.

The prediction processing of the image encoder 100 will be described below.

A plurality of prediction modes are prepared in the image encoder 100 in FIG. 1, and the prediction modes differ from each other in a method for generating the predicted image signal 11 and a motion compensation block size. Specifically, the method by which the predictor 101 generates the predicted image signal 11 is divided into the intra prediction (also called intra-frame prediction) that generates a prediction image using the reference image signal 17 of the encoding target frame (or a field) and the inter prediction (also called inter-frame prediction) that generates a prediction image using the reference image signal 17 of at least one already-encoded reference frame (or a reference field). The predictor 101 selectively switches between the intra prediction and the inter prediction to generate the predicted image signal 11 of the encoding target block.

Figure 8A:
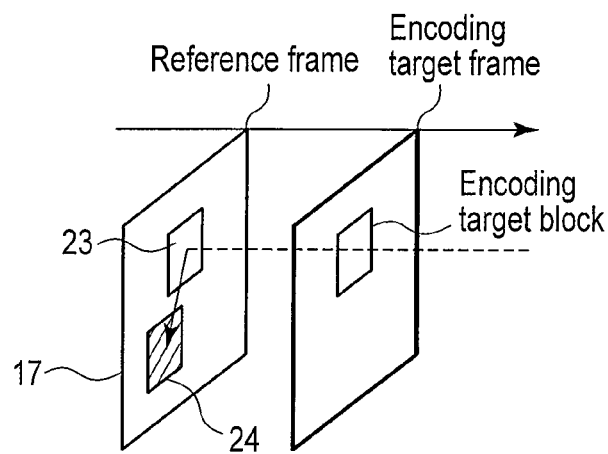
FIG. 8A is a view illustrating an example of inter prediction processing performed by the image encoding apparatus in FIG. 1.

FIG. 8A illustrates an example of the inter prediction. Typically, the inter prediction is performed in prediction units, and different pieces of motion information 18 can be possessed in prediction units. As illustrated in FIG. 8A, in the inter prediction, the predicted image signal 11 is generated using the reference image signal 17 of a block 24 in the position that is spatially shifted from a block 23 according to the motion vector included in the motion information 18, wherein the block 23 is of a pixel block in the already-encoded reference frame (for example, the already-encoded frame in one frame earlier) and is located in the same position as the prediction unit of the encoding target. That is, the reference image signal 17 of the block 24 in the reference frame, which is specified by the position (a coordinate) of the encoding target block and the motion vector included in the motion information 18, is used in generating the predicted image signal 11.

In the inter prediction, motion compensation of decimal pixel accuracy (for example, ½ pixel accuracy or ¼ pixel accuracy) can be performed, and a value of an interpolation pixel is generated by performing filtering processing to the reference image signal 17. For example, in H.264, interpolation processing can be performed to a luminance signal up to the ¼ pixel accuracy. In the case of the motion compensation of the ¼ pixel accuracy, an information amount of the motion information 18 is quadruple of that of the integer pixel accuracy. The interpolation processing can be performed using arbitrary filtering instead of the filtering defined in H.264.

The inter prediction is not limited to the example in which the reference frame in the preceding frame is used as illustrated in FIG. 8A, and any already-encoded reference frame may be used as illustrated in FIG. 8B. In the case that the reference image signals 17 of the multiple reference frames having different temporal positions are retained, the information indicating where the predicted image signal 11 is generated from the reference image signal 17 in the temporal position is expressed by the reference frame number. The reference frame number is included in the motion information 18. The reference frame number can be changed in region units (such as picture units and block units). That is, a different reference frame can be used in each prediction unit. For example, in the case that the reference frame in the first preceding already-encoded frame is used in the prediction, the reference frame number in this region is set to 0. In the case that the reference frame in the second preceding already-encoded frame is used in the prediction, the reference frame number in this region is set to 1. For example, in the case that the reference image signal 17 only for one frame is retained in the frame memory 107 (only one reference frame is retained), the reference frame number is always set to 0.

In the inter prediction, the size suitable for the encoding target block can be selected from the previously-prepared sizes of the prediction units. For example, as illustrated in FIGS. 5A to 5I, the motion compensation can be performed in each prediction unit that is obtained by dividing the coding tree unit.

As described above, the motion information 18 on the already-encoded pixel block (for example, 4-by-4-pixel block) in the encoding target frame used for the inter prediction is retained as the reference motion information 19, so that the shape, the motion vector, and the reference frame number of the optimum motion compensation block can be used according to a local property of the input image signal 10. The coding tree unit and the prediction unit can arbitrarily be combined. In the case that the coding tree unit is the 64-by-64-pixel block, the 16-by-16-pixel block can hierarchically be used from the 64-by-64-pixel block by further dividing the four coding tree units (32-by-32-pixel blocks), into which the 64-by-64-pixel block is divided, into four. Similarly, the 8-by-8-pixel block can hierarchically be used from the 64-by-64-pixel block. In the case that the prediction unit is one in which the coding tree unit is divided into four, hierarchical motion compensation processing from the 64-by-64-pixel block to the 4-by-4-pixel block can be performed.

The motion reference block and the available block will be described below.

The motion reference block is selected from the encoding target frame and the already-encoded block in the reference frame according to the method decided by both the image encoding apparatus in FIG. 1 and an image decoding apparatus. In the present embodiment, as illustrated in FIG. 9A, an already-encoded block A that is adjacent to an encoding target block X in the left direction and an already-encoded block B that is adjacent to the encoding target block X in the upward direction are selected as the motion reference block from the already-encoded blocks of the encoding target frame. Pixels a and b, which are specified by relative positions in FIG. 9B from the upper-left pixel in the encoding target block, belong to the blocks A and B, respectively. That is, the block A includes the pixel a that is adjacent to the upper-left pixel in the encoding target block in the left direction, and the block B includes the pixel b that is adjacent to the upper-left pixel in the encoding target block in the upward direction.

Each available block is selected from the motion reference blocks by the available-block acquiring module 109. The available block is a block to which the inter prediction is applied in the motion reference blocks. In the case of the existence of the motion reference blocks, to which the inter prediction is applied and which have the same motion information, one of the motion reference blocks is selected as the available block. Therefore, in the case the available blocks are selected, the available blocks have different motion vectors.

When selecting the available block from the motion reference blocks, the available-block acquiring module 109 outputs the available block information 20 indicating the selected available block. For example, as illustrated in FIG. 9A, in the case that the motion reference blocks are the blocks A and B that are adjacent to the encoding target block, the available-block acquiring module 109 refers to the pieces of reference motion information 19 on the blocks A and B to determine whether the blocks A and B are the available blocks, and the available-block acquiring module 109 outputs the available block information 20 indicating a determination result.

The number of motion reference blocks is not limited to two in FIG. 9A, and the number of motion reference blocks may be three or more. For example, in addition to the blocks A and B, already-encoded adjacent blocks C and D in FIG. 9C are used as the motion reference block. FIG. 9D illustrates an example of the relative positions of the pixels a, b, c, and d included in the blocks A, B, C, and D in FIG. 9D with respect to the upper-left pixel in the encoding target block X. At this point, the encoding target block is illustrated as the N-by-N-pixel block. The block C includes the pixel c in the position that is shifted from the upper-left pixel in the encoding target block X by N pixels in the right direction and by one pixel in the upward direction, and the block D includes the pixel d in the position that is shifted from the upper-left pixel in the encoding target block X by one pixel in the left direction and by one pixel in the upward direction. In the present embodiment, as illustrated in FIG. 9A, the example in which the blocks A and B adjacent to the encoding target block are selected as the motion reference block is described.

The predictor 101 of the first embodiment will be described in detail below.

As illustrated in FIG. 10, the predictor 101 includes the first predictor 1001, the second predictor 1002, and a prediction method selector switch 1003.

The predictor 101 selectively switches between the first predictor 1001 and the second predictor 1002 to generate the predicted image signal 11.

The first predictor 1001 generates a predicted image signal 11A according to a first prediction method. Specifically, the first predictor 1001 selects, as a selection block, the block, which is used for the prediction, from the available blocks indicated by the available block information 20, and generates the predicted image signal 11A using reference motion information 19 on the selection block. The first predictor 1001 outputs information on the selection block (selection block information) 21. The selection block information (also referred to as selection information) 21 includes information on the number of available blocks and information identifying the selection block. The selection block information/prediction switching information encoder 703 encodes the selection block information 21 using a code table that is previously decided according to the number of available blocks indicated by the available block information 20.

Figure 11:
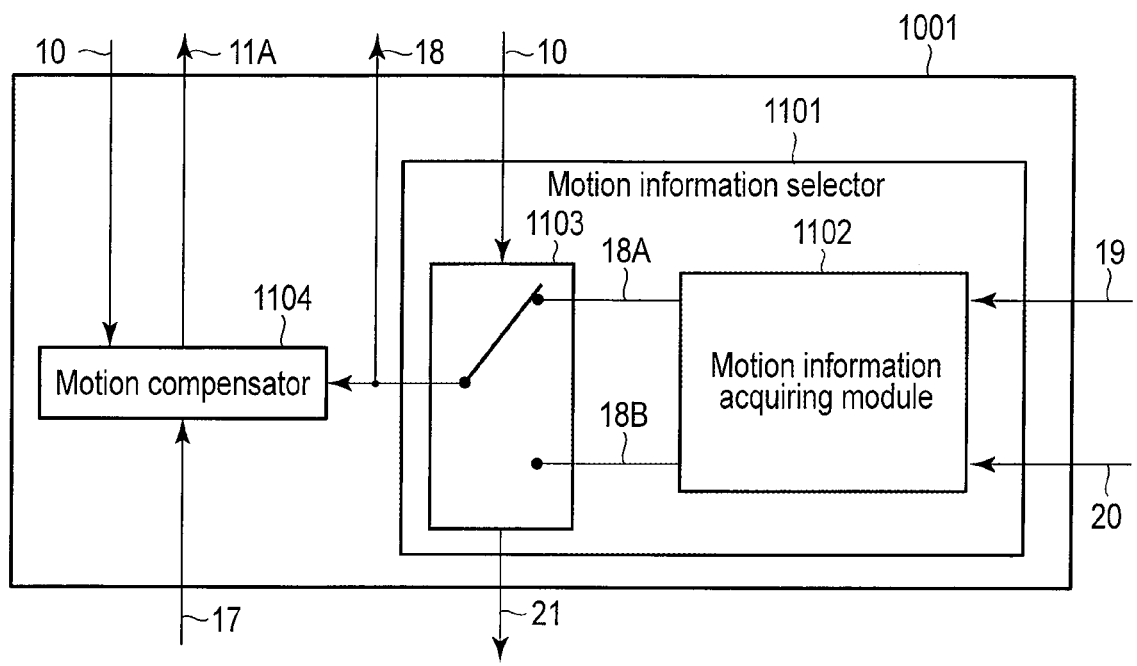
FIG. 11 is a view illustrating detail of first predictor in FIG. 10.

FIG. 11 illustrates the first predictor 1001 in detail. As illustrated in FIG. 11, the first predictor 1001 includes a motion information selector 1101 and a motion compensator 1104. The available block information 20, the reference motion information 19, and the reference image signal 17 are input to the first predictor 1001, and the first predictor 1001 outputs the predicted image signal 11A, the motion information 18, and the selection block information 21.

As illustrated in FIG. 11, the motion information selector 1101 includes a motion information acquiring module 1102 and a motion information selector switch 1103. The available block information 20 and the reference motion information 19 on the motion reference block are provided to the motion information acquiring module 1102. The motion information acquiring module 1102 generates motion information 18A and motion information 18B. The motion information 18A includes the reference motion information 19 on the motion reference block A and the available block information 20, and the motion information 18B includes the reference motion information 19 on the motion reference block B and the available block information 20. In the present embodiment, as illustrated in FIG. 9A, the motion reference block A is spatially adjacent to the encoding target block in the left direction, namely, adjacent to the encoding target block in the left direction in the encoding target frame. The motion reference block B is spatially adjacent to the encoding target block in the upward direction, namely, adjacent to the encoding target block in the upward direction in the encoding target frame.

The motion information acquiring module 1102 outputs as many pieces of motion information as available blocks. In the case that the two motion reference blocks A and B are set, as in the first embodiment, the two pieces of motion information are output at most. For example, the pieces of motion information 18A and 18B are output when both the motion reference blocks A and B are selected as the available block, and the motion information is not output when both the motion reference blocks A and B are not selected as the available block. In the case that the four motion reference blocks are set as illustrated in FIG. 9C, the four pieces of motion information are output at most according to the number of available blocks.

The motion information selector switch 1103 selects one selection block from the available blocks to transmit one of the pieces of motion information 18A and 18B as the motion information 18 to the motion compensator 1104. The motion information selector switch 1103 outputs the selection block information 21 indicating which available block is selected as the selection block. For example, the motion information selector switch 1103 selects the available block as the selection block such that an encoding cost derived from a cost equation indicated by the following mathematical formula (1) is minimized.

$$J = D + \lambda \times R \quad (1)$$

where J indicates the encoding cost and D indicates an encoding strain expressing a sum of squared difference between the input image signal 10 and the reference image signal 17. R indicates a code amount estimated by temporary encoding and A indicates a Lagrange undetermined coefficient defined by the quantization width. The encoding cost J may be calculated using only the code amount R or the encoding strain D instead of the mathematical formula (1), and a cost function of the mathematical formula (1) may be produced using a value in which the code amount R or the encoding strain D is approximated. The encoding strain D is not limited to the sum of squared difference, and the encoding strain D may be a sum of absolute difference (SAD). Only the code amount related to the motion information may be used as the code amount R. The selection block is not limited to the example in which the available block minimizing the encoding cost is selected as the selection block, and one available block having a value within a range where the encoding cost is at least the minimum may be selected as the selection block.

The motion compensator 1104 derives the position of the pixel block, in which the reference image signal 17 is taken out as the predicted image signal, based on the reference motion information (or a reference motion information group) on the selection block selected by the motion information selector 1101. In the case that the reference motion information group is input to the motion compensator 1104, the motion compensator 1104 divides the pixel block taken out as the predicted image signal by the reference image signal 17 into small pixel blocks (for example, 4-by-4-pixel blocks), and applies the corresponding reference motion information to each small pixel block to acquire the predicted image signal 11A from the reference image signal 17. For example, as illustrated in FIG. 8A, the position of the block in which the predicted image signal 11A is acquired is shifted from the small pixel block to the spatial direction according to the motion vector included in the reference motion information 19.

Thus, the motion compensator 1104 generates the predicted image signal 11A using the reference motion information (one of pieces of reference motion information 19A and 19B) from the motion information selector 1101 and the reference image signal 17 from the frame memory 107. However, in the case that the available block is not selected, the first predictor 1001 does not perform the prediction processing, and only the second predictor 1002 performs the prediction processing.

Figure 12:
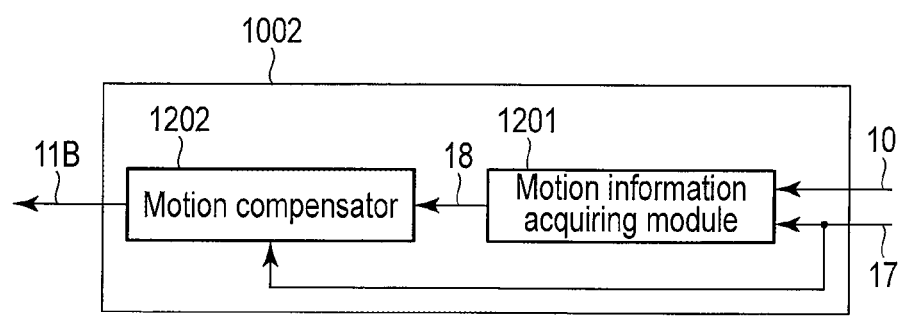
FIG. 12 is a view illustrating detail of second predictor in FIG. 10.

The second predictor 1002 in FIG. 10 generates a predicted image signal 11B of the encoding target block according to a second prediction method, in which the motion information 18 is derived from the input image signal 10 and the reference image signal 17 to perform the motion compensation. As illustrated in FIG. 12, the second predictor 1002 includes a motion information acquiring module 1201 that generates the motion information 18 using the input image signal 10 and the reference image signal 17 and a motion compensator 1202 that generates the predicted image signal 11B using the reference image signal 17 and the motion information 18. For example, based on the input image signal 10 and the reference image signal 17, the motion information acquiring module 1201 evaluates the motion information 18 including the motion vector and the reference frame number, which should be allocated to the encoding target block, by block matching. A value in which a difference between the input image signal 10 and the post-matching interpolation image is accumulated in each pixel can be used as a criterion of the matching.

In the predictor 101, one of the predicted image signal 11A from the first predictor 1001 and the predicted image signal 11B from the second predictor 1002 is selected by the prediction method selector switch 1003 in FIG. 10. For example, according to the mathematical formula (1), the prediction method selector switch 1003 evaluates the encoding cost for each of the predicted image signals 11A and 11B using the input image signal 10, and selects one of the predicted image signals 11A and 11B such that the encoding cost decreases. Then the prediction method selector switch 1003 outputs the selected predicted image signal as the predicted image signal 11. The prediction method selector switch 1003 also outputs the motion information 18, which is used to generate the predicted image signal 11, and the prediction switching information 22 indicating which one of the first predictor 1001 and the second predictor 1002 generates the predicted image signal 11. The prediction method selector switch 1003 further outputs the selection block information 21 in the case that the predicted image signal 11A is selected.

Figure 13:
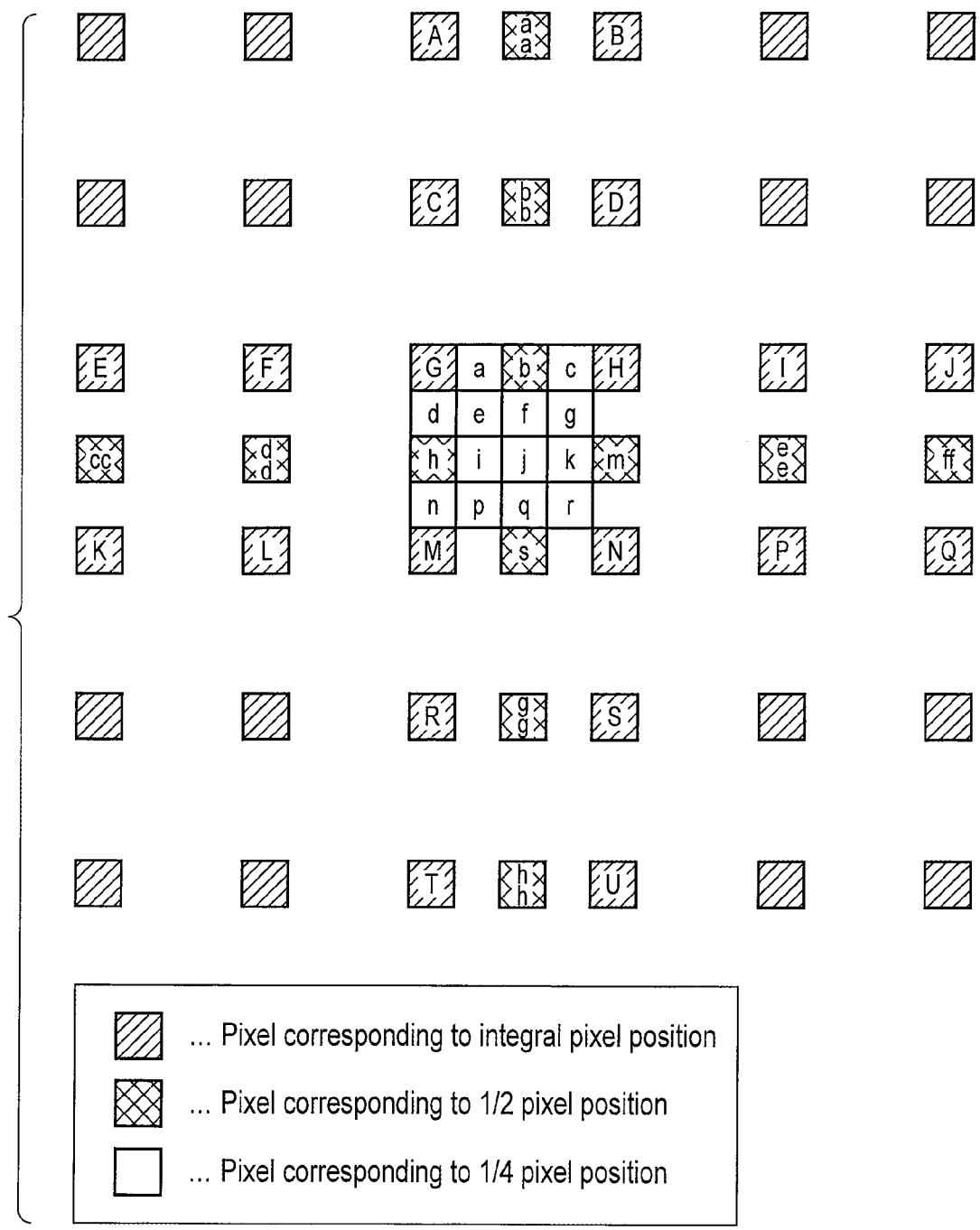
FIG. 13 is a view illustrating processing of interpolating available few-pixel accuracy in motion compensation processing performed by a motion compensator in FIGS. 10 and 12.

The same motion compensation processing as that of H.264 can be used as the motion compensation processing performed by the motion compensators 1104 and 1202. An interpolation technique of the ¼ pixel accuracy will specifically be described by way of example. In the interpolation of the ¼ pixel accuracy, the motion vector points out an integral pixel position in the case that each component of the motion vector is a multiple of 4. In other cases, the motion vector points out a predicted position corresponding to an interpolation position of fractional accuracy.

$$x\_pos = x + (mv\_x/4)$$

$$y\_pos = y + (mv\_y/4) \qquad (2)$$

where x and y indicate indexes in vertical and horizontal directions of a beginning position (for example, an upper-left top) of the prediction target block, and x_pos and y_pos indicate the corresponding predicted position of the reference image signal 17. (my_x,mv_y) indicates the motion vector having the ¼ pixel accuracy. A predicted pixel is generated with respect to the determined pixel position through processing of compensating or interpolating the corresponding pixel position of the reference image signal 17. FIG. 13 illustrates an example of the predicted pixel generated according to H.264. In FIG. 13, a square (a square drawn by oblique lines) indicated by a capital letter expresses the pixel in the integral position, and a hatched square expresses the interpolation pixel in the ½ pixel position. A white square expresses the interpolation pixel corresponding to the ¼ pixel position. For example, in FIG. 13, the processing of interpolating ½ pixels corresponding to the positions of the letters b and h is calculated by the following mathematical formula (3).

$$b = (E - 5 \times F + 20 \times G + 20 \times H - 5 \times I + J + 16) >> 5$$

$$h = (A - 5 \times C + 20 \times G + 20 \times M - 5 \times R + T + 16) >> 5 \qquad (3)$$

A letter (for example, b, h, and Cl) indicated in the mathematical formulae (3) and (4) indicates the value of the pixel to which the same letter is provided in FIG. 13. ">>" indicates a right shift calculation, and ">>5" corresponds to a division by 32. That is, the interpolation pixel in the ½ pixel position is calculated with a six-tap FIR (Finite Impulse Response) filter (tap coefficient: (1,−5,20,20,−5,1)/32).

In FIG. 13, the processing of interpolating ¼ pixels corresponding to the positions of the letters a and d is calculated by the following mathematical formula (4).

$$a = (G + b + 1) >> 1$$

$$d = (G + h + 1) >> 1 \qquad (4)$$

Thus, the interpolation pixel in the ¼ pixel position is calculated with a two-tap average-value filter (tap coefficient: (½,½)). The processing of interpolating ½ pixel corresponding to the letter j existing in the middle of the four integral pixel positions is generated with six taps in the vertical direction and six taps in the horizontal direction. For other pixel positions, the interpolation pixel value is generated in a similar manner.

The interpolation processing is not limited to the examples of the mathematical formulae (3) and (4), and the interpolation pixel value may be generated using another interpolation coefficient. A fixed value provided from the encoding controller 150 may be used as the interpolation coefficient, or the interpolation coefficient may be optimized in each frame based on the encoding cost and generated using the optimized interpolation coefficient.

An operation of the predictor 101 will be described with reference to FIG. 14.

In Step S1401 in FIG. 14, whether the prediction method applied to the motion reference blocks (for example, blocks A and B in FIG. 9A) adjacent to the encoding target block is the intra prediction or the inter prediction is determined, or whether the motion reference blocks is the block that is located in a region out of a screen or a pre-coding region, where the block cannot be referred to, is determined. Because the block to which the inter prediction is applied has the reference motion information 19, whether the block to which the inter prediction is adapted can be determined by the existence or non-existence of the reference motion information 19. When the intra prediction is applied to both the blocks A and B in Step S1401, or when both the blocks A and B cannot be referred to in Step S1401, the flow goes to Step S1405, and the available block is not selected. In the case that the available block is not selected, the first predictor 101 cannot perform the prediction processing, and the flow goes to Step S1413.

In Step S1413, the second predictor 1002 performs the motion compensation processing using the motion information 18 that is derived by the block matching defined in H.264. In the case that the available block is not selected, because only the second predictor 1002 is used, it is not necessary to encode the prediction switching information (a merge_flag) 22 switching between the first predictor 1001 and the second predictor 1002 and the selection block information (a merge_left_flag) 21.

When the inter prediction is applied to one of the motion reference blocks A and B in Step S1401, the flow goes to Step S1404. In Step S1404, the motion reference block to which the inter prediction is applied is selected as the available block. It is assumed that the available block is a block Y (Y is A or B).

In Step S1407, whether the motion compensation is performed by the first predictor 1001 is determined. Specifically, the motion compensation that is performed by applying the reference motion information 19 on the block Y to the encoding target block and the motion compensation that is performed by the second predictor 1002 are switched using the prediction switching information (the merge_flag) 22. When the prediction switching information 22 indicates the use of the first predictor 1001 (that is, the merge_flag is true), the flow goes to Step S1412. In Step S1412, the first predictor 1001 performs the motion compensation processing using the reference motion information 19 on the block Y.

When the prediction switching information 22 indicates the use of the second predictor 1002 (that is, the merge_flag is false) in Step S1407, the flow goes to Step S1413. In Step S1413, as described above, the second predictor 1002 performs the motion compensation. For example, in the switching in S1407, the encoding cost expressed by the mathematical formula (1) is calculated, and one of the first predictor 1001 and the second predictor 1002 is selected such that the encoding cost becomes smaller.

When the inter prediction is applied to both the motion reference blocks A and B in Step S1401, the flow goes to Step S1402. In Step S1402, whether the motion reference blocks A and B are identical to each other in the reference motion information 19 is determined. When the motion reference blocks A and B are identical to each other in the reference motion information 19, the flow goes to Step S1404. In Step S1404, one of the motion reference blocks A and B is selected as the available block Y. The pieces of processing after Step S1404 are described above.

When the motion reference blocks A and B differ from each other in the reference motion information 19 in Step S1402, the flow goes to Step S1403. In this case, the two available blocks are selected in Step S1403. In Step S1406, whether the motion compensation is performed using the first predictor 1002 is determined. Specifically, the motion compensation performed by the first predictor 1002 and the motion compensation performed by the second predictor 1002 are switched using the prediction switching information (merge_flag) 22. When the prediction switching information 22 indicates the use of the second predictor 1002 (that is, the merge_flag is false), the flow goes to Step S1413, and the second predictor 1002 performs the motion compensation.

When the prediction switching information 22 indicates the use of the first predictor 1001 (that is, the merge_flag is true) in Step S1406, the flow goes to Step S1409. In Step S1409, whether the motion reference block A is used in the prediction processing of the first predictor 1001 is determined. Specifically, whether the motion reference block A or the motion reference block B is used is determined based on the selection block information (the merge_left_flag) 21. For example, in the switching in S1409, the encoding cost expressed by the mathematical formula (1) is calculated, and one of the motion reference block A and the motion reference block B is selected such that the encoding cost becomes smaller.

When the motion reference block A is used (that is, the merge_left_flag is true), the flow goes to Step S1410. In Step S1410, the first predictor 1002 performs the motion compensation processing using the reference motion information 19 on the motion reference block A as the motion information 18 on the encoding target block. On the other hand, when the motion reference block B is used (that is, the merge_left_flag is false), the flow goes to Step S1411. In Step S1411, the first predictor 1001 performs the motion compensation processing using the reference motion information 19 on the motion reference block B as the motion information 18 on the encoding target block.

The prediction methods are switched according to the number of available blocks, and the existence or non-existence of the encoding of each of the prediction switching information and the selection block information is switched according to the number of available blocks, so that an efficient prediction method can be performed with a small code amount.

A syntax used by the image encoding apparatus in FIG. 1 will be described below.

Figures 15, 16:
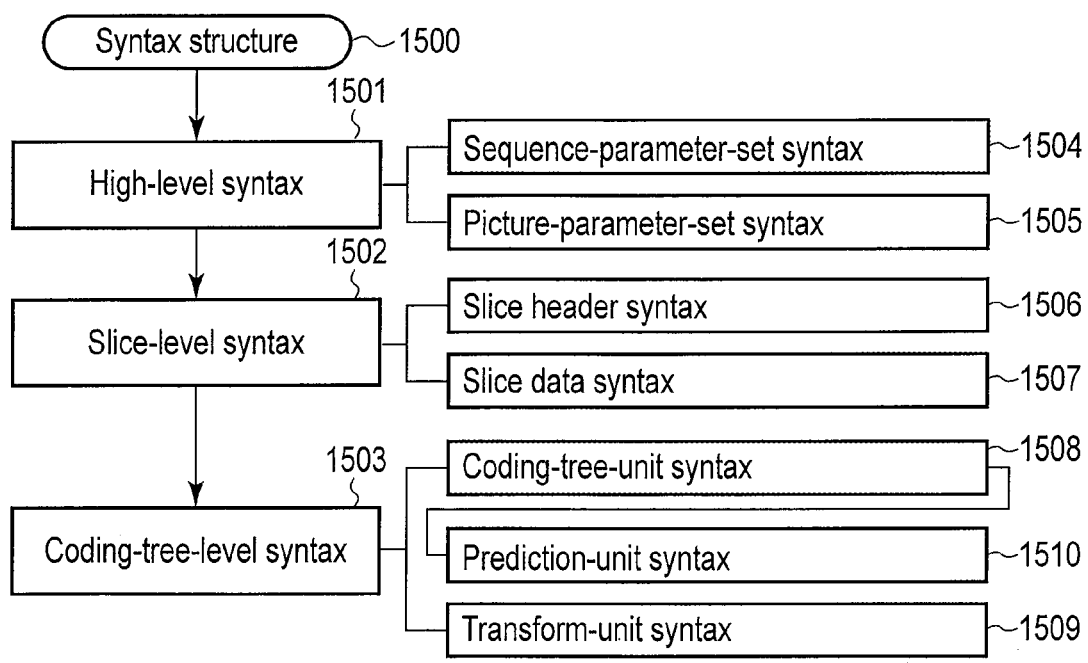
FIG. 15 is a view illustrating a syntax structure of the first embodiment.
FIG. 16 is a view illustrating an example of a sequence parameter set syntax of the first embodiment.

A syntax indicates a structure of the encoded data (for example, the encoded data 14 in FIG. 1) when the image encoding apparatus encodes the moving image data. In decoding the encoded data, the image decoding apparatus refers to the same syntax structure to perform a syntax interpretation. FIG. 15 illustrates an example of a syntax 1500 used by the image encoding apparatus in FIG. 1.

The syntax 1500 includes three parts, namely, a high-level syntax 1501, a slice-level syntax 1502, and a coding-tree-level syntax 1503. The high-level syntax 1501 includes syntax information on a layer higher than a slice. The slice means a rectangular region or a continuous region, which is included in the frame or the field. The slice-level syntax 1502 includes information necessary to decode each slice. The coding-tree-level syntax 1503 includes information necessary to decode each coding tree unit. Each of the parts includes a further detailed syntax.

The high-level syntax 1501 includes sequence-level and picture-level syntaxes, such as a sequence-parameter-set syntax 1504 and a picture-parameter-set syntax 1505. The slice-level syntax 1502 includes a slice header syntax 1506 and a slice data syntax 1507. The coding-tree-level syntax 1503 includes a coding-tree-unit syntax 1508 and a prediction-unit syntax 1509.

The coding-tree-unit syntax 1508 can have a quadtree structure. Specifically, the coding-tree-unit syntax 1508 can recursively be called as a syntax element of the coding-tree-unit syntax 1508. That is, one coding tree unit can be segmented by the quadtree. The coding-tree-unit syntax 1508 includes a transform-unit syntax 1510 and a prediction-unit syntax 1509. The pieces of information on the inverse orthogonal transform and the quantization are described in the transform-unit syntax 1510, and the transform-unit syntax 1510 is called in each coding-tree-unit syntax 1508 at a tail end of the quadtree.

FIG. 16 illustrates an example of the sequence-parameter-set syntax 1504 of the present embodiment. An inter_merge_flag in FIG. 16 is a syntax element indicating whether the first prediction method of the present embodiment is valid in the sequence. In the case that the inter_merge_flag is set to 0, the inter_merge_flag indicates that the first prediction method is invalid in the slice. In this case, only the second prediction method becomes valid. Accordingly, it is not necessary to encode the following merge_flag and merge_left_flag. For example, in the case that the inter_merge_flag is set to 1, the first prediction method of the present embodiment is valid in the whole region of the slice.

As illustrated in FIG. 17, the inter_merge_flag may be included in the slice header syntax 1506. In this case, the inter_merge_flag is a syntax element indicating whether the first prediction method is valid in the slice.

FIG. 18 illustrates an example of the coding-tree-unit syntax 1508. A split_coding_unit_flag in FIG. 18 is a flag indicating whether the coding tree unit is divided into four. In the case that the split_coding_unit_flag is set to 1, the split_coding_unit_flag indicates that the coding tree unit is divided into four. In this case, the syntax of the coding tree unit that is obtained by dividing the coding tree unit into four is recursively called. Parameters x0, x1, y0, and y1 in FIG. 18 are used to indicate the positions of the four divided coding tree units, and a splitCodingUnitSize indicates the size of each of the four divided coding tree unit.

In the case that the split_coding_unit_flag is set to 0, the split_coding_unit_flag indicates that the coding tree unit is not divided into four. An NumMergeCandidates indicates the number of available blocks that are derived in FIG. 14. In the case that the available block exists (that is, NumMergeCandidates>0), the merge_flag indicating the prediction switching information 22 is encoded. In the case that the merge_flag is set to 1, the merge_flag indicates that the first prediction method is used. In the case that the merge_flag is set to 0, the merge_flag indicates that the second prediction method is used. In the case that the merge_flag is set to 1 (true) while the two available blocks exist (that is, NumMergeCandidates>1), the merge_left_flag that is of the selection block information 21 indicating which one of the motion reference blocks A and B is used as the selection block is encoded. In the case that the merge_flag is set to 0, because the second prediction method is used, the prediction-unit syntax is called to encode the prediction information (such as the motion information 18) in the coding tree unit.

In the case that the merge_flag is set to 1, it is not necessary to encode parameters (such as the motion information 18 and the prediction unit division information) related to the prediction in the coding tree unit.

As illustrated in FIG. 19, the merge_flag and the merge_left_flag may be included in the prediction unit syntax. In this case, the merge_flag and the merge_left_flag have the same meanings as the merge_flag and merge_left_flag in FIG. 18.

As illustrated in FIG. 9C, in the case that the at least three motion reference blocks and three or more available blocks exist, the selection block information (merge_left_flag) may be not the flag but information including a plurality of symbols.

Whether the first prediction method is valid may be switched according to the size of the coding tree unit (encoding target block). FIG. 20 illustrates an example of the coding tree syntax in which whether the first prediction method is valid is switched according to the size of the coding tree unit. A merge_available_size( ) in FIG. 20 is a function that outputs validity/invalidity of the first prediction method in each size (a currCodingUnitSize) of the encoding target block, namely, mode encoding information indicating whether the prediction switching information (the merge_flag) is encoded according to the size of the encoding target block. In the case that the merge_available_size( ) is set to 1, the first prediction method is valid. On the other hand, in the case that the merge_available_size( ) is set to 0, the first prediction method is invalid, and only the second prediction method is valid. In this case, it is not necessary to encode the merge_flag and the merge_left_flag. The switching information in the merge_available_size( ) may previously be encoded by the sequence-parameter-set syntax, the picture-parameter-set syntax, and the slice header syntax. The same switching information as the later-described decoding apparatus may be retained. In another embodiment, the NumMergeCandidates in FIG. 18 may always be set to 0 instead of setting the merge_available_size( ) to 0.

When the coding tree syntax in FIG. 20 is used, the first prediction method can be invalidated in the coding tree unit having the specific size, and the code amounts of the prediction switching information and the selection block information can be reduced.

As described above, in the image encoding apparatus of the first embodiment, the available block is selected from the plurality of motion reference blocks, the existence or non-existence of the encoding of each of the prediction switching information and the selection block information is switched according to the number of selected available blocks. Therefore, the code amount can be reduced and the high encoding efficiency can be implemented. Additionally, in the image encoding apparatus of the first embodiment, whether the first prediction method is used is determined according to the size of the encoding target block, and it is not necessary to encode the prediction switching information and the selection block information when the first prediction method is not used. Therefore, the code amount can be reduced.

Second Embodiment

An image encoding apparatus according to a second embodiment will be described below. The image encoding apparatus of the second embodiment has a configuration similar to that of the first embodiment in FIG. 1. A component and an operation, which are different from those of the first embodiment, are mainly described in the second embodiment. In the first embodiment, the first prediction method is applied to the coding tree unit of the encoding target. On the other hand, in the second embodiment, the first prediction method is applied to the prediction unit of the encoding target.

In the second embodiment, the block X in FIG. 9A corresponds to the prediction unit of the encoding target, and the blocks A and B correspond to the motion reference blocks. Additionally, for the available block and the selection block, the coding tree unit may be replaced with the prediction unit in the description related to the first prediction method of the first embodiment.

FIG. 21 illustrates an example of a prediction-unit syntax 1509 of the second embodiment. An NumPuParts(inter_partitioning_idc) in FIG. 21 is an index that defines the method for dividing the prediction unit. Specifically, the NumPuParts(inter_partitioning_idc) indicates the number of prediction units into which the prediction unit is divided as illustrated in FIGS. 5A to 5I. The NumPuParts is 2 in the example in FIG. 5B, and the NumPuParts is 4 in the example in FIG. 5D. A variable i in FIG. 21 is an index of the divided prediction unit. An NumMergeCandidates in FIG. 21 indicates the number of available blocks in the prediction unit i. A merge_flag[i] and a merge_left_flag[i] in FIG. 21 indicate the prediction switching information and the selection block information in the prediction unit i, respectively. The methods for deriving the merge_flag[i] and the merge_left_flag[i] are identical to those of the first embodiment.

As described above, the same effect as the first embodiment can be obtained in the image encoding apparatus of the second embodiment in which the first prediction method is applied to the prediction unit.

Third Embodiment

Figure 22:
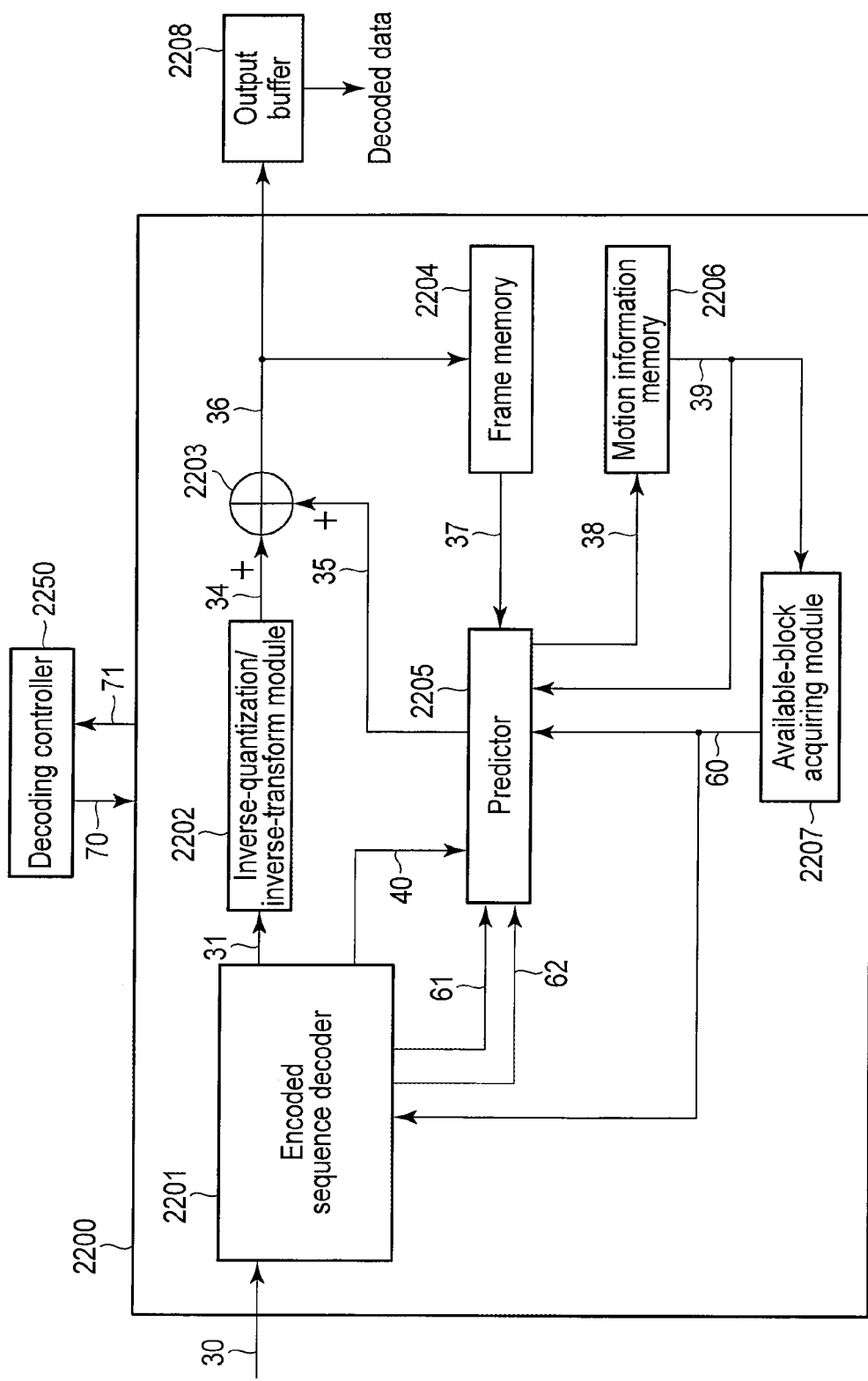
FIG. 22 is a block diagram schematically illustrating an image decoding apparatus according to a third embodiment.

FIG. 22 schematically illustrates an image decoding apparatus according to a third embodiment. As illustrated in FIG. 22, the image decoding apparatus includes an image decoder 2200, a decoding controller 2250, and an output buffer 2208. The image decoding apparatus of the third embodiment corresponds to the image encoding apparatus of the first embodiment. That is, the decoding processing performed by the image decoding apparatus in FIG. 22 has a complementary relationship with the encoding processing performed by the image encoding processing in FIG. 1. The image decoding apparatus in FIG. 22 may be realized by hardware, such as an LSI chip, or realized by causing a computer to execute an image decoding program.

The image decoding apparatus in FIG. 22 includes the image decoder 2200, the decoding controller 2250, and the output buffer 2208. The image decoder 2200 includes an encoded sequence decoder 2201, an inverse-quantization/inverse-transform module 2202, an adder 2203, a frame memory 2204, a predictor 2205, a motion information memory 2206, and an available-block acquiring module 2207. In the image decoder 2200, encoded data 30 from the storage system (not illustrated) or the transmission system (not illustrated) is provided to the encoded sequence decoder 2201. For example, the encoded data 30 corresponds to the encoded data 14, which is transmitted from the image encoding apparatus in FIG. 1 while multiplexed.

The image decoding apparatus in FIG. 22 decodes the encoded data 30 by selectively switching between the prediction method (the first prediction method) in which, as illustrated in FIG. 9A, the motion compensation is performed using the pieces of reference motion information possessed by the blocks A and B adjacent to the decoding target block X as the motion information on the decoding target block X and the prediction method (the second prediction method) in which, like H.264, the motion compensation is performed to the decoding target block using one motion vector.

In the present embodiment, the pixel block (for example, the coding tree unit, the prediction unit, the macroblock, and one pixel) that is of a decoding target is referred to as a decoding target block. An image frame including the decoding target block is referred to as a decoding target frame.

In the encoded sequence decoder 2201, the decoding is performed in each frame or field by a syntax analysis based on the syntax. Specifically, the encoding sequence decoder 2201 sequentially performs variable length decoding of an encoded sequence of each syntax, and decodes encoding parameters related to the decoding target block to obtain decoding parameters. The decoding parameters include motion information 40, prediction switching information 62, selection block information 61, a transform coefficient 33, and the pieces of prediction information, such as the block size information and the prediction mode information.

In the present embodiment, the decoding parameters include the transform coefficient 33, the selection block information 61, and the prediction information, and the decoding parameters include all the parameters necessary to decode the information on the transform coefficient, the information on the quantization, and the like. The prediction information, the information on the transform coefficient, and the information on the quantization are provided as control information 71 to the decoding controller 2250. The decoding controller 2250 provides the decoding control information 70, which includes the parameters necessary to decode the prediction information, the quantization parameter, and the like, to each module of the image decoder 2200.

Figure 23:
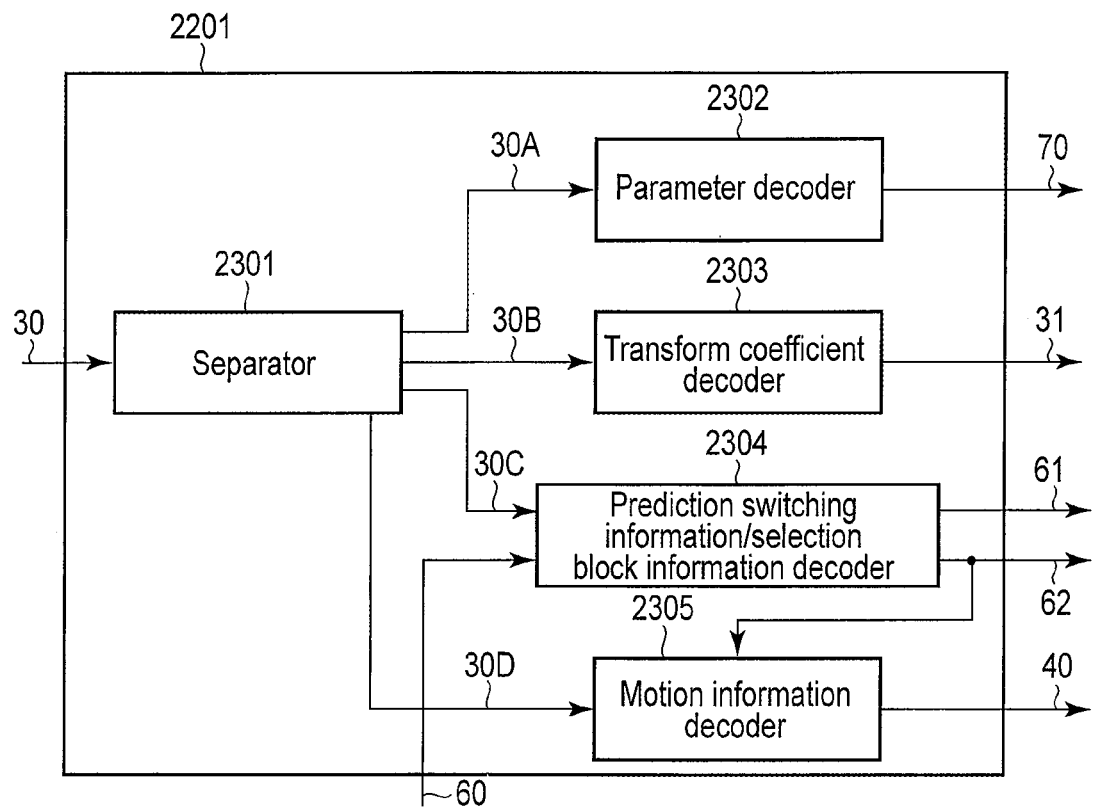
FIG. 23 is a block diagram illustrating detail of an encoding sequence decoder in FIG. 22.

FIG. 23 illustrates the detailed encoded sequence decoder 2201. As illustrated in FIG. 23, the encoded sequence decoder 2201 includes a separator 2301, a parameter decoder 2302, a transform coefficient decoder 2303, a prediction switching information/selection block information decoder 2304, and a motion information decoder 2305.

The separator 2301 separates the encoded data 30 in syntax units to generate encoded data 30A including parameters related to the block size and the quantization, encoded data 30B including the transform coefficient information, encoded data 30C including the prediction information and the selection block information, and encoded data 30D including the motion information.

The parameter decoder 2302 decodes the encoded data 30A to obtain the parameters related to the block size information and the quantization. The transform coefficient decoder 2303 decodes the encoded data 30B to obtain the transform coefficient information 31. The prediction switching information/selection block information decoder 2304 decodes the encoded data 30C to obtain the selection block information 61 and the prediction switching information 62.

The prediction switching information/selection block information decoder 2304 receives available block information 60 indicating the number of available blocks from the available block acquiring module 2207, and decodes the selection block information 61 using a code table that is previously decided according to the number of available blocks. However, in the case that the available block information 60 indicates that the available block is not selected, it is not necessary for the prediction switching information/selection block information decoder 2304 to decode the encoded data 30C including the prediction switching information 62 and the available block information 60.

The motion information decoder 2305 decodes the encoded data 30D to obtain the motion information 40. The motion information decoder 2305 receives the prediction switching information 62 from the prediction switching information/selection block information decoder 2304, and refers to the prediction switching information 62. In the case that the prediction switching information 62 indicates that the predictor 101 in FIG. 1 uses the second prediction method, namely, in the case that the decoding target block is encoded by the second prediction method, it is not necessary for the prediction switching information/selection block information decoder 2304 to decode the encoded data 30C.

The transform coefficient information 31 decoded by the transform coefficient decoder 2303 is transmitted to the inverse-quantization/inverse-transform module 2202. Various pieces of control information (for example, a quantization parameter and a quantization matrix) 71 on the quantization, which are decoded by the parameter decoder 2302, are provided to the decoding controller 2250 and loaded to the inverse-quantization/inverse-transform module 2202 during the inverse quantization. The inverse-quantization/inverse-transform module 2202 inversely quantizes the transform coefficient information 31 according to the loaded information on the quantization, and performs the inverse transform processing (for example, the inverse discrete cosine transform) to generate a prediction error signal 34. The inverse transform processing performed by the inverse-quantization/inverse-transform module 2202 in FIG. 22 is an inverse transform of the transform processing performed by the transform/quantization module 103 in FIG. 1. For example, in the case that the image encoding apparatus in FIG. 1 performs the wavelet transform, the inverse-quantization/inverse-transform module 2202 performs the inverse quantization and the inverse wavelet transform.

The prediction error signal 34 restored by the inverse-quantization/inverse-transform module 2202 is transmitted to the adder 2203. The adder 2203 generates a decoded image signal 36 by adding the prediction error signal 34 from the inverse-quantization/inverse-transform module 2202 and a predicted image signal 35 generated by the predictor 2205. The generated decoded image signal 36 is output from the image decoder 2200, and tentatively stored in the output buffer 2208. Then the decoded image signal 36 is output at an output timing managed by the decoding controller 2250. The decoded image signal 36 is also stored as a reference image signal 37 in the frame memory 2204. The reference image signal 37 is properly read in each frame or field by the predictor 2205.

The available-block acquiring module 2207 receives reference motion information 39 from the motion information memory 2206, and outputs available block information 60. Because the operation of the available-block acquiring module 2207 is identical to that of the available-block acquiring module 109 (shown in FIG. 1) of the first embodiment, the description is omitted.

The motion information memory 2206 receives motion information 38 from the predictor 2205, and temporarily stores the motion information 38 as the reference motion information 39. The motion information memory 2206 stores the reference motion information 39 in the same manner as the motion information memory 108 in FIG. 6A. That is, the motion information memory 2206 retains the reference motion information 39 in frame units, and the pieces of motion information 38 on the already-decoded coding tree unit and the prediction unit are stored as the reference motion information 39 in the motion information memory 2206.

The motion information memory 2206 may store the reference motion information 39 in the same manner as the motion information memory 108 in FIG. 6B. That is, only the reference motion information 39 on the pixel block adjacent to the decoding target block may be retained.

The motion reference block and the available block will be described below. The motion reference block is selected from the decoding target frame and the already-decoded block in the reference frame according to the method decided by both the image encoding apparatus in FIG. 1 and the image decoding apparatus in FIG. 22. In the present embodiment, as illustrated in FIG. 9A, the already-decoded block A that is adjacent to the decoding target block X in the left direction and the already-decoded block B that is adjacent to the decoding target block X in the upward direction are selected as the motion reference blocks from the already-decoded blocks of the decoding target frame. Pixels a and b, which are specified by the relative positions in FIG. 9B from the upper-left pixel in the decoding target block, belong to the blocks A and B, respectively. That is, the block A includes the pixel a that is adjacent to the upper-left pixel of the decoding target block in the left direction, and the block B includes the pixel b that is adjacent to the upper-left pixel of the decoding target block in the upward direction.

The number of motion reference blocks is not limited to two in FIG. 9A, and the number of motion reference blocks may be at least three. For example, in addition to the blocks A and B, the already-decoded adjacent blocks C and D in FIG. 9C are used as the motion reference block. FIG. 9D illustrates an example of the relative positions of the pixels a, b, c, and d included in the blocks A, B, C, and D in FIG. 9D with respect to the upper-left pixel in the decoding target block X. At this point, the decoding target block is illustrated as the N-by-N-pixel block. The block C includes the pixel c in the position that is shifted from the upper-left pixel in the decoding target block X by N pixels in the right direction and by one pixel in the upward direction, and the block D includes the pixel d in the position that is shifted from the upper-left pixel in the decoding target block X by one pixel in the left direction and by one pixel in the upward direction. In the third embodiment, the example in which the blocks A and B in FIG. 9A are selected as the motion reference block is described.

The available block is selected from the motion reference blocks by the available-block acquiring module 2207. The available block is a block to which the inter prediction is applied in the motion reference blocks. In the case of the existence of a plurality of motion reference blocks, to which the inter prediction is applied and which have the same motion information, one of the motion reference blocks is selected as the available block. Therefore, in the case the plurality of available blocks are selected, the available blocks have different motion vectors.

When selecting the available block from the motion reference blocks, the available-block acquiring module 2207 outputs the available block information 60 indicating the selected available block. For example, as illustrated in FIG. 9A, in the case that the motion reference blocks are the blocks A and B that are adjacent to the decoding target block, the available-block acquiring module 2207 refers to the pieces of reference motion information 39 on the blocks A and B to determine whether the blocks A and B are the available blocks, and the available-block acquiring module 2207 outputs the available block information 60 indicating a determination result.

An operation of the predictor 2205 will be described with reference to FIG. 24.

Figure 24:
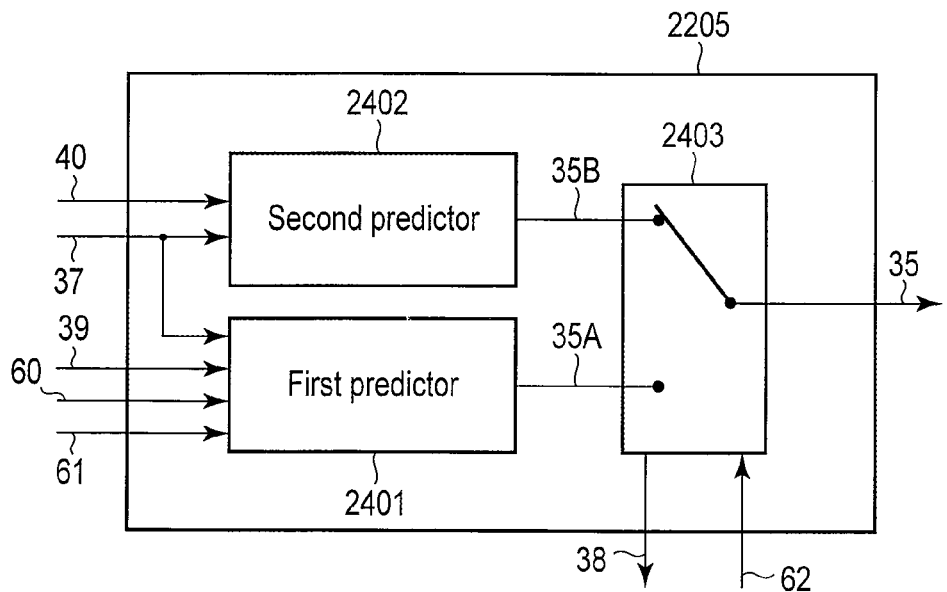
FIG. 24 is a block diagram illustrating detail of a predictor in FIG. 22.

As illustrated in FIG. 24, the predictor 2205 includes a first predictor 2401, a second predictor 2402, and a prediction method selector switch 2403. The available block information 60, the selection block information 61, the reference motion information 39, and the reference image signal 37 are input to the first predictor 2401, and the first predictor 2401 generates a predicted image signal 35A according to the first prediction method. Using the reference image signal 37 and the motion information 40 from the encoding sequence decoder 2201, the second predictor 2402 performs the motion compensation prediction similarly to the second predictor 1002 of the first embodiment, and generates a predicted image signal 35B. Based on the prediction switching information 62, the prediction method selector switch 2403 selects one of the predicted image signal 35A of the first predictor 2401 and the predicted image signal 35B from the second predictor 2402, and outputs the selected predicted image signal as the predicted image signal 35. At the same time, the motion information selector switch 2503 transmits the motion information, which is used by the selected first predictor 2401 or second predictor 2402, as the motion information 38 to the motion information memory 2206.

Figure 25:
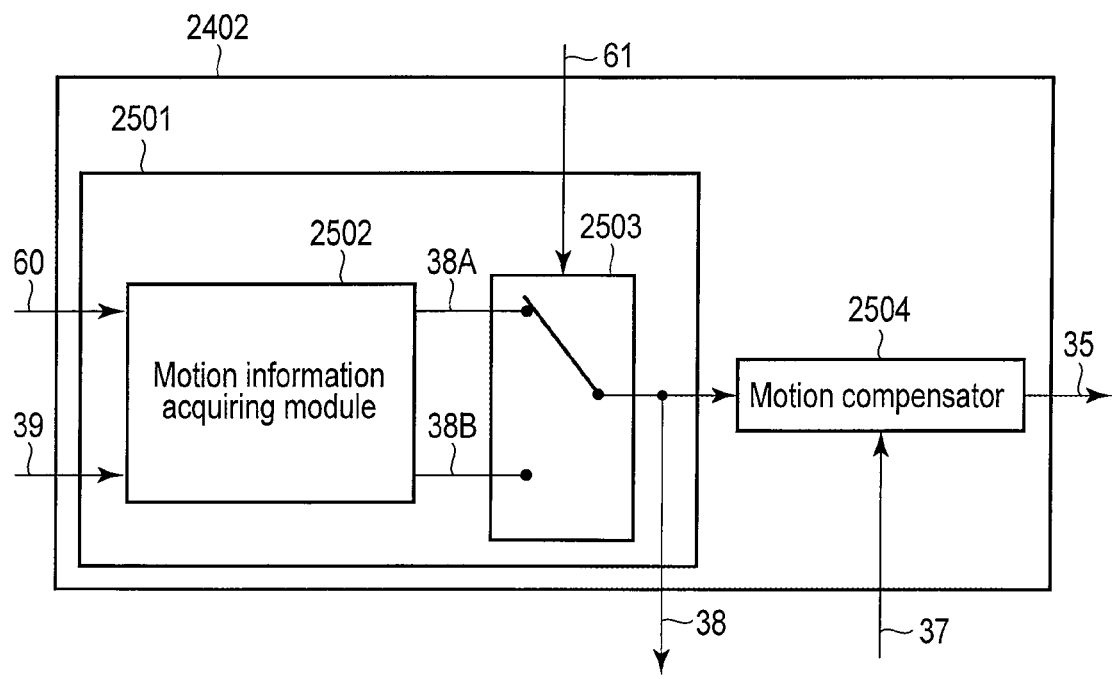
FIG. 25 is a block diagram illustrating detail of a first predictor in FIG. 24.

As illustrated in FIG. 25, the first predictor 2401 includes a motion information selector 2501 and a motion compensator 2504, and the motion information selector 2501 includes a motion information acquiring module 2502 and a motion information selector switch 2503. Basically, the first predictor 2401 has the same configuration and function as the first predictor 1001 of the first embodiment.

The available block information 60, the selection block information 61, the reference motion information 39, and the reference image signal 37 are input to the first predictor 2401, and the first predictor 2401 outputs the predicted image signal 35 and the motion information 38. The motion information acquiring module 2502 has the same function as the motion information acquiring module 1102 of the first embodiment. That is, the motion information acquiring module 2502 outputs motion information 38A including the reference motion information 39 on the motion reference block A and the available block information 60 and motion information 38B including the reference motion information 39 on the motion reference block B and the available block information 60. As illustrated in FIG. 9A, the motion reference block A is spatially adjacent to the encoding target block in the left direction and the motion reference block B is spatially adjacent to the encoding target block in the upward direction. The motion information acquiring module 2502 outputs as many pieces of motion information as available blocks. In the third embodiment, because the two motion reference blocks are set as illustrated in FIG. 9A, the two pieces of motion information are output at most according to the two motion reference blocks. In the case that the four motion reference blocks are set as illustrated in FIG. 9C, the four pieces of motion information are output at most according to the number of available blocks.

The motion information selector switch 2503 selects one of the pieces of motion information 38A and 38B according to the selection block information 61, and transmits the selected motion information as the motion information 38 to the motion compensator 1104. Using the motion information 38 and the reference image signal 37, the motion compensator 2504 performs the same motion compensation prediction as the motion compensator 1104 to generate the predicted image signal 35A.

Figure 26:
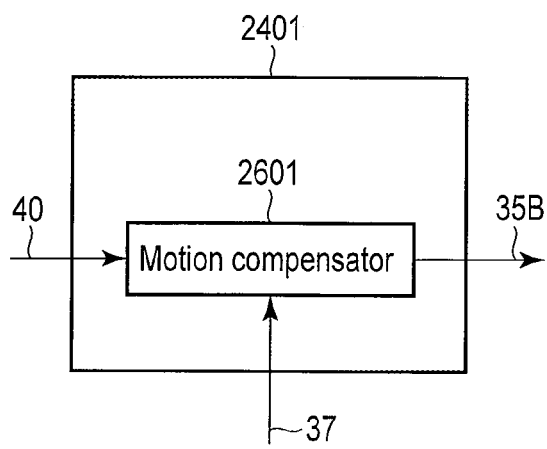
FIG. 26 is a block diagram illustrating detail of a second predictor in FIG. 24.

As illustrated in FIG. 26, the second predictor 2402 includes a motion compensator 2601. Using the reference image signal 37 and the motion information 40 obtained by the encoding sequence decoder 2201, the motion compensator 2601 performs the same motion compensation prediction as the motion compensator 2504 in FIG. 25 to generate the predicted image signal 35B.

According to the prediction switching information 62, the prediction method selector switch 2403 in FIG. 24 selects one of the predicted image signal 35A of the first predictor 2401 and the predicted image signal 35B from the second predictor 2402, and outputs the selected predicted image signal as the predicted image signal 35. The prediction method selector switch 2403 also outputs the motion information, which is used to obtain the selected predicted image signal, as the motion information 38. The motion information 38 is transmitted to the motion information memory 2206.

Because the operation of the predictor 2205 is identical to that of the predictor 101 of the first embodiment in FIG. 14, the description is omitted. However, in the description of the operation of the predictor 2205, it is necessary to properly replace the encoding with the decoding.

A syntax used by the image decoding apparatus in FIG. 22 will be described below.

The syntax indicates a structure when the image decoding apparatus decodes the moving image data. FIG. 15 illustrates an example of a syntax 1500 used by the image decoding apparatus in FIG. 22.

The syntax 1500 includes three parts, namely, a high-level syntax 1501, a slice-level syntax 1502, and a coding-tree-level syntax 1503. The high-level syntax 1501 includes syntax information on the layer higher than the slice. The slice means the rectangular region or the continuous region, which is included in the frame or the field. The slice-level syntax 1502 includes information necessary to decode each slice. The coding-tree-level syntax 1503 includes information necessary to decode each coding tree unit. Each of the parts includes the further detailed syntax.

The high-level syntax 1501 includes sequence-level and picture-level syntaxes, such as a sequence-parameter-set syntax 1504 and a picture-parameter-set syntax 1505. The slice-level syntax 1502 includes a slice header syntax 1506 and a slice data syntax 1507. The coding-tree-level syntax 1503 includes a coding-tree-unit syntax 1508 and a prediction-unit syntax 1509.

The coding-tree-unit syntax 1508 can have the quadtree structure. Specifically, the coding-tree-unit syntax 1508 can recursively be called as the syntax element of the coding-tree-unit syntax 1508. That is, one coding tree unit can be segmented by the quadtree. The coding-tree-unit syntax 1508 includes a transform-unit syntax 1510 and the prediction-unit syntax 1509. The pieces of information on the inverse orthogonal transform and the quantization are described in the transform-unit syntax 1510, and the transform-unit syntax 1510 is called in each coding-tree-unit syntax 1508 at the tail end of the quadtree.

FIG. 16 illustrates an example of the sequence-parameter-set syntax 1504 of the present embodiment. The inter_merge_flag in FIG. 16 is the syntax element indicating whether the first prediction method of the present embodiment is valid in the sequence. In the case that the inter_merge_flag is set to 0, the inter_merge_flag indicates that the first prediction method is invalid in the slice. In this case, only the second prediction method becomes valid. Accordingly, it is not necessary to decode the following merge_flag and merge_left_flag. For example, in the case that the inter_merge_flag is set to 1, the first prediction method of the present embodiment is valid in the whole region of the slice.

As illustrated in FIG. 17, the inter_merge_flag may be included in the slice header syntax 1506. In this case, the inter_merge_flag is the syntax element indicating whether the first prediction method is valid in the slice.

FIG. 18 illustrates an example of the coding-tree-unit syntax 1508. A split_coding_unit_flag in FIG. 18 is the flag indicating whether the coding tree unit is divided into four. In the case that the split_coding_unit_flag is set to 1, the split_coding_unit_flag indicates that the coding tree unit is divided into four. In this case, the syntax of the coding tree unit that is obtained by dividing the coding tree unit into four is recursively called. Parameters x0, x1, y0, and y1 in FIG. 18 are used to indicate the positions of the four divided coding tree units, and the splitCodingUnitSize indicates the size of each of the four divided coding tree units.

In the case that the split_coding_unit_flag is set to 0, the split_coding_unit_flag indicates that the coding tree unit is not divided into four. The NumMergeCandidates indicates the number of available blocks that are derived in FIG. 14. In the case that the available block exists (that is, NumMergeCandidates>0), the merge_flag indicating the prediction switching information 62 is decoded. In the case that the merge_flag is set to 1, the merge_flag indicates that the first prediction method is used. In the case that the merge_flag is set to 0, the merge_flag indicates that the second prediction method is used. In the case that the merge_flag is set to 1 (true) while the two available blocks exist (that is, NumMergeCandidates>1), the merge_left_flag that is of the selection block information 61 indicating which one of the motion reference blocks A and B is used as the selection block is decoded. In the case that the merge_flag is set to 0, because the second prediction method is used, the prediction-unit syntax is called to decode the prediction information (such as the motion information 38) in the coding tree unit.

In the case that the merge_flag is set to 1, it is not necessary to decode parameters (such as the motion information 38 and the prediction unit division information) related to the prediction in the coding tree unit.

As illustrated in FIG. 19, the merge_flag and the merge_left_flag may be included in the prediction unit syntax. In this case, the merge_flag and the merge_left_flag have the same meanings as the merge_flag and merge_left_flag in FIG. 18.

As illustrated in FIG. 9C, in the case that the three or more motion reference blocks and at least three available blocks exist, the selection block information (merge_left_flag) may be not the flag but information including a plurality of symbols.

Whether the first prediction method is valid may be switched according to the size of the coding tree unit (decoding target block). FIG. 20 illustrates an example of the coding tree syntax in which whether the first prediction method is valid is switched according to the size of the coding tree unit. The merge_available_size( ) in FIG. 20 is the function that outputs validity/invalidity of the first prediction method in each size (the currCodingUnitSize) of the encoding target block, namely, mode encoding information indicating whether the prediction switching information (the merge_flag) is encoded according to the size of the encoding target block. In the case that the merge_available_size( ) is set to 1, the first prediction method is valid. On the other hand, in the case that the merge_available_size( ) is set to 0, the first prediction method is invalid, and only the second prediction method is valid. In this case, it is not necessary to decode the merge_flag and the merge_left_flag. The switching information in the merge_available_size( ) may previously be decoded by the sequence-parameter-set syntax, the picture-parameter-set syntax, and the slice header syntax. The same switching information as the later-described decoding apparatus may be retained. In another embodiment, the NumMergeCandidates in FIG. 18 may always be set to 0 instead of setting the merge_available_size( ) to 0.

When the coding tree syntax in FIG. 20 is used, the first prediction method can be invalidated in the coding tree unit having the specific size, and the code amount of the prediction switching information and the selection block information can be reduced.

As described above, the image decoding apparatus of the third embodiment decodes the image that is encoded by the image encoding apparatus of the first embodiment. Accordingly, the image decoding apparatus of the third embodiment can reproduce a high-quality decoded image from a relatively small amount of encoded data.

Fourth Embodiment

An image decoding apparatus according to a fourth embodiment will be described below. The image decoding apparatus of the fourth embodiment has a configuration similar to that of the third embodiment in FIG. 22. A component and an operation, which are different from those of the third embodiment, are mainly described in the fourth embodiment. In the third embodiment, the first prediction method is applied to the coding tree unit of the decoding target. On the other hand, in the fourth embodiment, the first prediction method is applied to the prediction unit of the decoding target. The block X in FIG. 9A corresponds to the prediction unit of the decoding target, and the blocks A and B correspond to the motion reference blocks. Additionally, for the available block and the selection block, the coding tree unit may be replaced with a prediction unit in the description related to the first prediction method of the third embodiment.

FIG. 21 illustrates an example of a prediction-unit syntax 1509 of the fourth embodiment. An NumPuParts(inter_partitioning_idc) in FIG. 21 is the index that defines the method for dividing the prediction unit. Specifically, the NumPuParts(inter_partitioning_idc) indicates the number of prediction units into which the prediction unit is divided as illustrated in FIGS. 5A to 5I. The NumPuParts is 2 in the example in FIG. 5B, and the NumPuParts is 4 in the example in FIG. 5D. The variable i in FIG. 21 is an index of the divided prediction unit. The NumMergeCandidates in FIG. 21 indicates the number of available blocks in the prediction unit i. The merge_flag[i] and the merge_left_flag[i] in FIG. 21 indicate the prediction switching information and the selection block information in the prediction unit i, respectively. The methods for deriving the merge_flag[i] and the merge_left_flag[i] are identical to those of the third embodiment.

As described above, the same effect as the third embodiment can be obtained in the image decoding apparatus of the fourth embodiment in which the first prediction method is applied to the prediction unit.

Modifications of the embodiments will be described below.

In the first to fourth embodiments, as illustrated in FIG. 4, by way of example, the frame is divided into the rectangular blocks, such as the coding tree unit, and the encoding and the decoding are sequentially performed from the upper-left block on the screen toward the lower-right block. However, the encoding order and the decoding order are not limited to the first to fourth embodiments. For example, the encoding and the decoding may sequentially be performed from the lower-right block toward the upper-left block, or the encoding and the decoding may spirally be performed from the center of the screen toward the screen end. Alternatively, the encoding and the decoding may sequentially be performed from the upper-right block toward the lower-left block, or the encoding and the decoding may spirally be performed from the screen end toward the center of the screen.

In the first to fourth embodiments, it is not necessary to unify all the block sizes in one coding tree unit, and different block sizes may be mixed. In the case that different block sizes are mixed in one coding tree unit, the code amount necessary to encode or decode the division information also increases with an increased number of divisions. Therefore, desirably the block size is selected in consideration of a balance between the code amount of the division information and the quality of the locally-decoded image or the decoded image.

In the first to fourth embodiments, for the sake of convenience, the luminance signal and the color-difference signal are not distinguished from each other, but the color signal component is described in detail. However, in the case that the luminance signal differs from the color-difference signal in the prediction processing, an identical or different prediction method may be adopted. In the case that the different prediction methods are used in the luminance signal and the color-difference signal, the prediction method selected for the color-difference signal can be encoded and decoded by the same method as the luminance signal.

In the first to fourth embodiments, for the sake of convenience, the luminance signal and the color-difference signal are not distinguished from each other, but the color signal component is described in detail. However, in the case that the luminance signal differs from the color-difference signal in the orthogonal transform processing, an identical orthogonal transform method may be adopted or a different orthogonal transform methods may be adopted. In the case that different orthogonal transform methods are adopted in the luminance signal and the color-difference signal, the orthogonal transform method selected for the color-difference signal can be encoded and decoded by the same method as the luminance signal.

In the first to fourth embodiments, a syntax element that is not defined herein can be inserted in a line space of the table indicated in the syntax configuration, and a description related to another conditional branching may be included. Alternatively, the syntax table may be divided and integrated into a plurality of tables. It is not always necessary to use an identical term, and the term may be arbitrarily changed according to an application mode.

As described above, in the first to fourth embodiments, a high-efficiency orthogonal transform and inverse orthogonal transform are implemented while the difficulty is reduced in the hardware mounting and the software mounting. According to the first to fourth embodiments, the encoding efficiency is improved, and therefore the subjective image quality is improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, a program performing the pieces of processing of each embodiment can be provided while being stored in a computer-readable storage medium. Computer-readable storage mediums having any storage format, such as a magnetic disk, an optical disk (for example, a CD-ROM, a CD-R, and a DVD), a magneto-optical disk (for example, an MO), and a semiconductor memory, may be used as long as the program can be stored in a computer-readable storage medium.

The program performing the pieces of processing of each embodiment may be stored in a computer (server) connected to a network, such as the Internet, and downloaded to a computer (client) through the network.

What is claimed is:

1. An image decoding method comprising:
    selecting available blocks from already-decoded blocks, the already-decoded blocks including a first block adjacent to a left of a target block and a second block adjacent to a top of the target block, wherein the selecting available blocks comprises:
        determining which of an inter prediction and an intra prediction is applied to the first block, wherein when it is determined that the intra prediction is applied to the first block, the first block is not selected as an available block,
        determining which of the inter prediction and the intra prediction is applied to the second block, wherein when it is determined that the intra prediction is applied to the second block, the second block is not selected as an available block,
        determining whether a motion vector of the first block is identical to a motion vector of the second block,
        selecting the first block and the second block as available blocks when the inter prediction is applied to the first block and the second block and the motion vector of the first block is different from the motion vector of the second block, and
        selecting one of the first block and the second block as an available block when the inter prediction is applied to the first block and the second block and the motion vector of the first block is identical to the motion vector of the second block, wherein the other of the first block and the second block is not selected as an available block;
    decoding, from input encoded data, selection information specifying one of the available blocks;
    selecting a block from the available blocks in accordance with the selection information;

generating a predicted image of the target block using a motion vector of the selected block;
decoding a transform coefficient from the input encoded data;
performing processing on the transform coefficient to obtain a prediction error, the processing including inverse transform; and
generating a decoded image by adding the predicted image and the prediction error.

2. An image decoding apparatus comprising:
processing circuitry configured to:
select available blocks from already-decoded blocks, the already-decoded blocks including a first block adjacent to a left of a target block and a second block adjacent to a top of the target block, wherein the selecting available blocks comprises:
  determining which of an inter prediction and an intra prediction is applied to the first block, wherein when it is determined that the intra prediction is applied to the first block, the first block is not selected as an available block,
  determining which of the inter prediction and the intra prediction is applied to the second block, wherein when it is determined that the intra prediction is applied to the second block, the second block is not selected as an available block,
  determining whether a motion vector of the first block is identical to a motion vector of the second block,
  selecting the first block and the second block as available blocks when the inter prediction is applied to the first block and the second block and the motion vector of the first block is different from the motion vector of the second block, and
  selecting one of the first block and the second block as an available block when the inter prediction is applied to the first block and the second block and the motion vector of the first block is identical to the motion vector of the second block, wherein the other of the first block and the second block is not selected as an available block;
decode, from input encoded data, selection information specifying one of the available blocks;
select a block from the available blocks in accordance with the selection information;
generate a predicted image of the target block using a motion vector of the selected block;
decode a transform coefficient from the input encoded data;
perform processing on the transform coefficient to obtain a prediction error, the processing including inverse transform; and
generate a decoded image by adding the predicted image and the prediction error.

3. An image encoding method comprising:
selecting available blocks from already-encoded blocks, the already-encoded blocks including a first block adjacent to a left of a target block and a second block adjacent to a top of the target block, wherein the selecting available blocks comprises:
  determining which of an inter prediction and an intra prediction is applied to the first block, wherein when it is determined that the intra prediction is applied to the first block, the first block is not selected as an available block,
  determining which of the inter prediction and the intra prediction is applied to the second block, wherein when it is determined that the intra prediction is applied to the second block, the second block is not selected as an available block,
  determining whether a motion vector of the first block is identical to a motion vector of the second block,
  selecting the first block and the second block as available blocks when the inter prediction is applied to the first block and the second block and the motion vector of the first block is different from the motion vector of the second block, and
  selecting one of the first block and the second block as an available block when the inter prediction is applied to the first block and the second block and the motion vector of the first block is identical to the motion vector of the second block, wherein the other of the first block and the second block is not selected as an available block;
selecting a block from the available blocks;
encoding selection information specifying the selected block;
generating a predicted image of the target block using a motion vector of the selected block;
generating a prediction error indicating a difference between an input image and the predicted image;
transforming the prediction error to obtain a transform coefficient; and
encoding the transform coefficient.

4. An image encoding apparatus comprising:
processing circuitry configured to:
select available blocks from already-encoded blocks, the already-encoded blocks including a first block adjacent to a left of a target block and a second block adjacent to a top of the target block, wherein the selecting available blocks comprises:
  determining which of an inter prediction and an intra prediction is applied to the first block, wherein when it is determined that the intra prediction is applied to the first block, the first block is not selected as an available block,
  determining which of the inter prediction and the intra prediction is applied to the second block, wherein when it is determined that the intra prediction is applied to the second block, the second block is not selected as an available block,
  determining whether a motion vector of the first block is identical to a motion vector of the second block,
  selecting the first block and the second block as available blocks when the inter prediction is applied to the first block and the second block and the motion vector of the first block is different from the motion vector of the second block, and
  selecting one of the first block and the second block as an available block when the inter prediction is applied to the first block and the second block and the motion vector of the first block is identical to the motion vector of the second block, wherein the other of the first block and the second block is not selected as an available block;
select a block from the available blocks;
encode selection information specifying the selected block;
generate a predicted image of the target block using a motion vector of the selected block;
generate a prediction error indicating a difference between an input image and the predicted image;
transform the prediction error to obtain a transform coefficient; and
encode the transform coefficient.

* * * * *